United States Patent
Sachs et al.

(10) Patent No.: US 6,629,559 B2
(45) Date of Patent: Oct. 7, 2003

(54) MOLDS FOR CASTING WITH CUSTOMIZED INTERNAL STRUCTURE TO COLLAPSE UPON COOLING AND TO FACILITATE CONTROL OF HEAT TRANSFER

(75) Inventors: Emanuel M. Sachs, Newton, MA (US); Won B. Bang, Santa Clara, CA (US); Michael J. Cima, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/131,001

(22) Filed: Apr. 24, 2002

(65) Prior Publication Data

US 2002/0157799 A1 Oct. 31, 2002

Related U.S. Application Data

(62) Division of application No. 09/577,920, filed on May 24, 2000, now Pat. No. 6,397,922.

(51) Int. Cl.⁷ .............................. B22C 9/02; B28B 7/34
(52) U.S. Cl. ..................... 164/361; 164/23; 164/34; 249/61
(58) Field of Search ................... 164/4.1, 34, 35, 164/361; 249/61, 114.1; 264/401, 497, 308, 219, 221

(56) References Cited

U.S. PATENT DOCUMENTS

| | | | |
|---|---|---|---|
| 5,204,055 A | * | 4/1993 | Sachs et al. ............... 264/113 |
| 5,340,656 A | | 8/1994 | Sachs et al. |
| 5,387,380 A | | 2/1995 | Cima et al. |
| 5,490,882 A | | 2/1996 | Sachs et al. |
| 5,775,402 A | * | 7/1998 | Sachs et al. ............... 164/97 |
| 5,807,437 A | | 9/1998 | Sachs et al. |
| 5,814,161 A | | 9/1998 | Sachs et al. |
| 5,940,674 A | | 8/1999 | Sachs et al. |
| 6,110,602 A | * | 8/2000 | Dickens et al. ........... 435/5 |

FOREIGN PATENT DOCUMENTS

WO   WO 98/56566   12/1998

* cited by examiner

Primary Examiner—M. Alexandra Elve
Assistant Examiner—Kevin McHenry
(74) Attorney, Agent, or Firm—Steven J. Weissburg

(57) ABSTRACT

A new mold solves problems that arise from differential changes in geometry inherent to casting metal in a ceramic mold, by control of the internal morphology between the surfaces of the mold that face the casting, and that face the external environment. Layered fabrication techniques are used to create a ceramic mold. For example, an internal geometry composed of a cellular arrangement of voids may be created within the mold wall. Structures may be designed and fabricated so that the ceramic mold fails at an appropriate time during the solidification and/or cooling of the casting. Thus, the casting itself is not damaged. The mold fails to avoid rupture, or even distortion, of the casting.

A thin shell of ceramic defines the casting cavity. This shell must be thin enough to fail due to the stresses induced (primarily compressive) by the metal next to it and partly adherent to it. A support structure is provided with a morphology that supports the thin shell that defines the casting geometry, yet that also fails as the casting solidifies and/or cools. Typically, the support structure is a skeletal network with voids therebetween. The skeletal elements may be struts, or sheets or both.

At least the following two failure mechanisms may be exploited in the design of the support structure: bending in the structure; and under compressive loads, either by buckling of a support member, or breakage under compressive loading. The failure of the support structure may also be due to a combination of bending and compression.

84 Claims, 13 Drawing Sheets

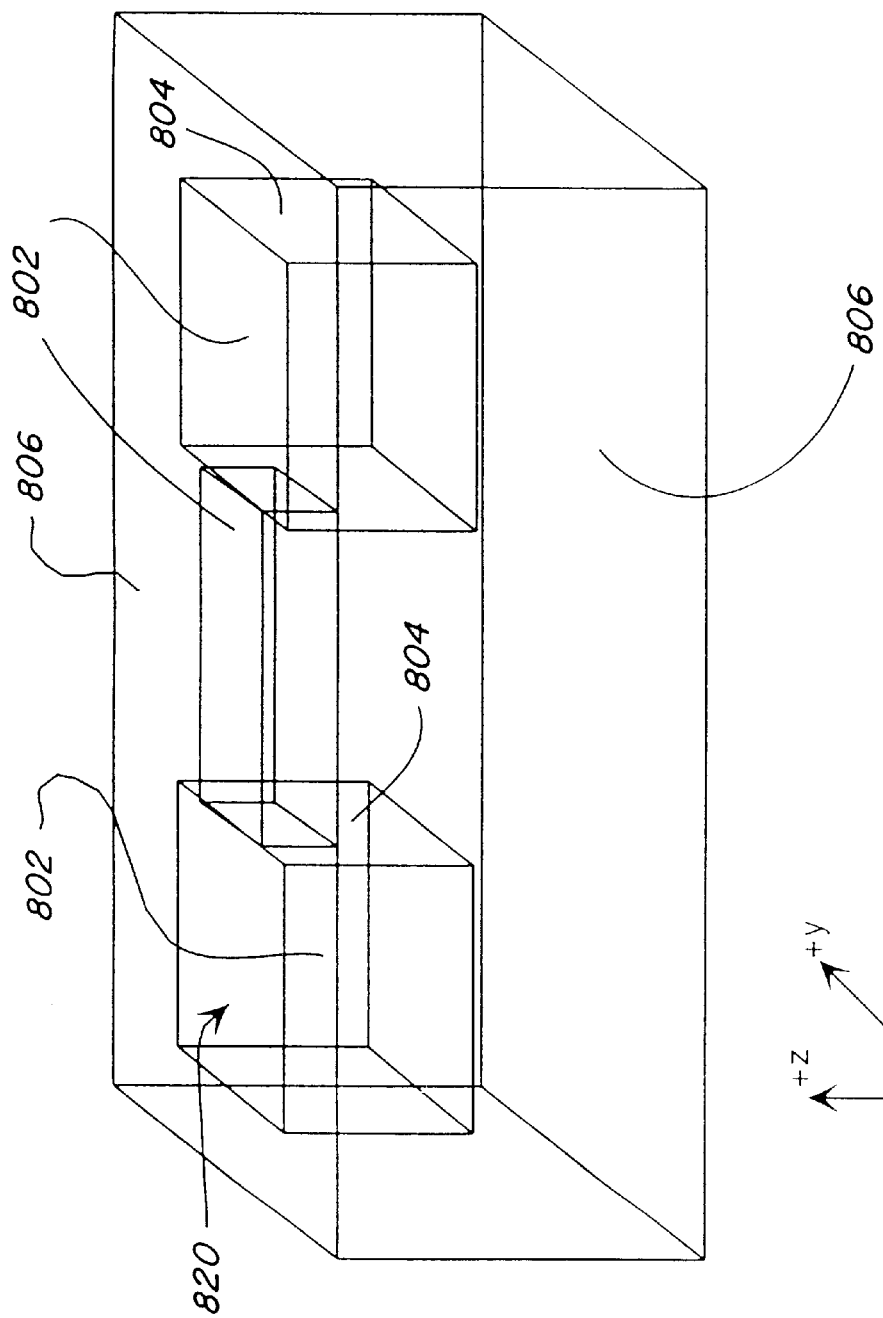
*FIG. 11*
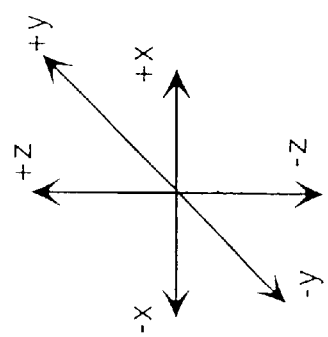

MOLDS FOR CASTING WITH CUSTOMIZED INTERNAL STRUCTURE TO COLLAPSE UPON COOLING AND TO FACILITATE CONTROL OF HEAT TRANSFER

This application is a divisional of application Ser. No. 09/577,920, filed on May 24, 2000 now U.S. Pat. No. 6,397,992, and hereby claims the benefit thereof.

GOVERNMENT RIGHTS

The United States Government has certain rights in this invention pursuant to an National Science Foundation Grant, NSF DDM-9215728.

BACKGROUND

This invention relates generally to casting and more specifically metal casting using ceramic containing molds.

A substantial number of metal castings are created by pouring molten metal into a ceramic mold. In sand casting, the mold is typically made of sand, held together with various binders. In investment casting, the mold is typically made of refractories, such as alumina powder, bound together by silica. A significant problem relates to a discrepancy in the change in the dimensions of the ceramic mold and the forming metal within the mold, as the casting cools.

The problem has two aspects. First, as most metals solidify from liquid, there is a significant volume change, generally a shrinkage, on the order of 5%, by volume. Second, the coefficient of thermal expansion of metals is typically substantially higher than that of ceramics. Thus, as the solidified casting continues to cool, the metal will shrink more than the ceramic.

Both these effects can lead to rupture or distortion of the casting. As the casting freezes, it is quite weak, and at that stage, can actually be torn apart by the constraints imposed by the ceramic mold. Such a failure is called a "hot tear," or "hot crack." As the casting continues to cool, it can be distorted by the constraints imposed by the ceramic mold.

Significant effort is expended in the casting art toward minimizing the difficulties imposed by the differential in change in dimension. Such efforts include control over the melt feeding pattern and freezing pattern through the use of risers and chills. In investment casting, the composition of the shell may be tailored, to promote its breakage during the cooling phase of the casting operation.

Typically a mold is made by providing a pattern whose outside shape is the shape of the object to be made. The pattern is made of a material that will burn away at a later stage. This pattern is dipped into a ceramic slurry, which forms a coating thereon. The coated shell is subsequently dipped in a different ceramic slurry, with different properties from the first ceramic slurry. The coated shell is dipped again and again into a succession of slurries, each being different from the previous slurry and the pattern is removed. The result is a hollow body coated with a succession of different coatings, much like layers of onion skin (except that the center of the body is hollow). The designer chooses the different coatings with the hope that they will themselves rupture, as the casting cools, thereby preventing the casting from distorting. Additional customization to promote or prevent mold rupture at specific locations can be provided by causing the shell to be thicker in certain locations.

Typically, the innermost layer is composed of a relatively fine grained ceramic slurry. Each subsequently applied slurry will typically be composed of coarser ceramic particles, such that each layer is successively coarser than the previous. The resultant body is porous. The distribution of particles and particle free void regions is uniform in each layer, and random within that layer, depending on the size and shape and uniformity of particles in the slurry, as well as the liquid content, both quantitative and qualitative. The voids are approximately the same size as the particles, and typically particles of any given layer can not pass through the voids in that layer. Further, the designer can not specify where in any layer, relative to the location of features in the casting, particles or voids will reside. Further, the designer has limited, if any, control over how, or where in the ceramic slurry coatings, relative to the features in the casting, the mold will break. The pattern of solid particles and voids within a layer is not predetermined or controllable, or repeatable in any way.

Typically if the mold is made, and it breaks prematurely, or in the wrong place, the designer will change the next attempt by using different coatings, or by increasing the thickness in different locations.

The following illustrates the problem quantitatively.

DIFFERENTIAL IN CHANGE IN GEOMETRY

Phase Change

As the molten metal solidifies, it contracts. It is important to note that this contraction results from the phase change, not a temperature change, which is discussed below. For example, aluminum contracts by between 3.5 and 8.5%, by volume (or equivalently, between about 1.2 and 3.8% in linear dimension) upon solidification. Nickel alloys contract approximately 3% by volume upon solidification. (ASM Handbook, Volume 15, p. 768 (aluminum) and p. 822 (nickel).)

In an extreme case, a casting may contract by this full amount upon solidification. More typically, a mold is designed with "risers," which continue to feed molten metal to the casting as it cools, to minimize the impact of the solidification shrinkage. However, in castings of complex geometry, such approaches often do not fully compensate for the shrinkage and some dimension change of the casting results.

TEMPERATURE CHANGE

As the casting continues to cool, after solidification, it contracts further. For example, the coefficient of thermal expansion of aluminum alloys and nickel alloys are approximately $20 \times 10^{-6}/°$ C. and $14 \times 10^{-6}/°$ C., respectively. Ceramic mold materials contract far less. For example, in the range of 200–1200° C., the coefficient of thermal expansion of alumina is approximately $7 \times 10^{-6}/°$ C. and that of fused silica is approximately $1 \times 10^{-6}/°$ C. Thus, for example, when an aluminum casting cools in a ceramic mold made of alumina from a solidification temperature of 630° C. to room temperature, the linear shrinkage of the metal is approximately 1.25% (after solidification) but the ceramic only shrinks approximately 0.4%. Thus, for example, a casting of 10 inch dimension (25.4 cm) will shrink 0.09 in. (0.22 cm) more than the mold that is containing it.

Thus, the difference in the degree of shrinkage of the casting upon solidification and the shrinkage of the casting after solidification due to cooling on the one hand, at the same time as the degree of shrinkage in the mold on the other hand may cause ruptures or distortions in the casting or mold rupture.

Such failure of the mold is uncontrolled and usually harmful. For instance, it may occur while the molding material is still liquid, or flowable, thereby resulting in leakage of the molding material from the mold. Or, it may occur at a location that does not provide the stress relief to the casting that is required.

SUMMARY

In general, the present invention solves the problems that arise from the differential changes in geometry inherent to casting metal in a ceramic mold, by control of the internal morphology. By "internal morphology" it is meant, between the surfaces of the mold that face the casting, and that face the external environment. Specifically, layered fabrication techniques are used to create a ceramic mold. Control may be exercised, not just over the geometry of the inner and outer walls of the mold themselves, but also of the morphology of the structure between the walls. For example, an internal geometry composed of a cellular arrangement of skeletal elements and voids may be created within the mold wall. Through such control of the internal morphology, structures may be designed and fabricated so that the ceramic mold is virtually guaranteed to fail at an appropriate time during the solidification and/or cooling of the casting. Thus, the casting itself is not damaged. As used herein in the context of the mold, "to fail" means to break, rupture or bend past an elastic limit. If a structure "fails" under a loading condition, it will not return to its original form after the loads are removed. The goal of the present invention is to design and control the mold to fail (break, rupture or bend past an elastic limit) and thus to avoid rupture, or even distortion, of the casting.

Such collapsing molds of the invention typically consist of a thin layer of ceramic, which defines the casting cavity. This layer must be thin enough to fail due to the stresses induced (primarily compressive) by the metal next to it and partly adherent to it. Such a thin layer, however, would not be strong enough to be manipulated, handled or to enable transport of the mold before use, or to withstand the pressure and forces of the molten metal during pouring of the casting. Thus another aspect of the present invention is to include a support structure with a morphology that supports the thin wall that defines the casting geometry, yet that also fails as the casting solidifies and/or cools.

At least the following two failure mechanisms may be exploited in the design of the support structure: failure by bending in the structure; and failure under compressive loads, either by buckling of a support member or, more likely by the breakage of the member under the compressive loading. The breakage of the support structure may also be due to a combination of bending and compression.

Thus, the designer has total control over where in the mold, relative to the locations of features in the casting, skeletal elements are, and also how they are oriented. Thus, the designer has total control over where, relative to the locations of features in the casting, the mold will be more likely to fail, and thus to avoid damage to the casting at even the most delicate of features.

A preferred embodiment of the invention is a mold for casting a part made from a molding material, such as metal, which material experiences dimensional change during a mold process. The mold comprises a thin inner shell, which defines a three dimensional cavity that will establish locations of features of the casting part, is impervious to flow of liquid molding material therethrough, and is configured to not fail under any stresses arising within the inner shell due to pouring of the liquid molding material into the cavity. The shell is, however, configured to fail under stresses arising within the inner shell as any such molding material solidifies or cools. The mold also includes a three-dimensional support body that supports the inner shell. The support body is defined by an internal structure of supporting skeletal elements in predetermined locations and orientations relative to features of the casting part, and voids between the skeletal elements. Like the shell, it is configured to not fail under any stresses arising within the support body due to pouring of the liquid molding material into the cavity; but it is configured through the locations and orientations of the skeletal elements within its internal structures to fail at predetermined regions relative to the locations of features of the casting part, under stresses arising within the support body as any such molding material solidifies and cools. The stresses within the support body and the shell that arise during a molding process are due to at least one phenomena of: any dimensional change of any molding material residing in the cavity upon solidification; and a difference between the coefficients of thermal expansion of the support body on the one hand and any such molding material on the other hand.

The support body is typically contiguous with the inner shell. The skeletal elements are arranged such that during any dimensional changes of the molding material, enough of the skeletal elements would fail to prevent distortions to the part being cast. Failure may be by bending, compression, or buckling.

Typically, the support body is a cellular body, which may have rectilinear cells, either equal or unequal in size. There is also typically a continuous open path from within each cell to outside the body.

In a preferred embodiment, the support is composed of ceramic powder particles that have been joined together. The voids in the support body typically have a linear dimension that exceeds three times the average linear dimension of the powder particles.

The support body may comprise photocurable polymer loaded with ceramic particles.

Frequently, the skeletal elements and voids are arranged in at least one story, which story comprises a course connected to struts, which are connected to the thin inner shell. The support structure typically comprises a plurality of stories, each of which comprises a course, connected to struts, which are connected to an adjacent story. The skeletal elements may be struts, lattice elements (which are similar) or sheets, or any combination thereof. The mold may include an outer shell that contacts an outermost story. The inner shell may have an open boundary with which the support body is not contiguous, thereby forming a tub-like mold.

In a preferred embodiment of this aspect of the invention, in a specified region, the struts have a cross-sectional area of $b^2$, and are spaced from adjacent struts a distance w. They are sized and spaced such that the ratio b/w is greater than the square root of the ratio of the hydrostatic pouring pressure of the molding material, over the minimum compressive strength of the material from which the struts are made. Such a mold will not fail under the charging of the mold with mold material.

Further, in another related preferred embodiment, adjacent a specified region of the casting, where the casting has a feature having a linear dimension D, the struts have a cross-sectional area of $b^2$ and each strut has a length L, and a neutral axis located a distance h from a surface of the strut which is under maximum tensile load. The struts are made from a material having an elastic modulus E, and the relative strain between the casting and the thin shell is $\epsilon_R$. The struts are sized and shaped further such that the maximum tensile breaking strength of the struts is less than.

$$\frac{6Eh}{L^2} * \frac{\varepsilon_R D}{2}.$$

This will ensure that the struts do break before the casting is damaged. For square struts, the maximum tensile breaking strength of the struts is less than.

$$\frac{3Eb}{L^2} * \frac{\varepsilon_R D}{2}.$$

An alternative version of a preferred embodiment of the invention is a mold comprising a thin inner shell that defines a three dimensional cavity that will establish locations of features of the casting part. The mold also includes a three-dimensional foraminous support body that is contiguous with and substantially surrounds the inner shell. The support body is constructed of skeletal elements with voids therebetween, the voids comprising a network having an open pathway from each void to outside the support body and the skeletal elements being positioned and oriented according to a designed morphology at predetermined regions relative to the locations of features of the casting part.

Many of the features of the embodiments discussed above are also aspects of this embodiment of the mold of the invention. The skeletal elements may be ceramic. The skeletal elements may be arranged in cells, as discussed above. The struts and sheets of the support body may have a cross-section that varies along their length and may be straight or curved. Furthermore, the skeletal elements and voids may be arranged to provide a predetermined pattern of heat transfer from any casting material as it cools to form a part to be made with the mold, which heat transfer varies at different locations in the pattern.

Yet another preferred embodiment of the invention is a method of making a mold using a solid free form layered fabrication technique. The method comprises the steps of: providing a machine readable model of a mold geometry comprising a thin shell and a support body, in accordance with any of the embodiments described above, and using the model to drive a solid free form layered fabrication machine, building up, by layers, a mold that is defined by the geometry.

The step of building up, by layers, may comprise the steps of depositing a layer of a powder material in a confined region and then applying a further material to one or more selected regions of the layer of powder material which will cause the layer of powder material to become bonded at the one or more selected regions that will become the inner shell and a plurality of skeletal elements of the support body. The steps of depositing powder and applying further material are repeated a selected number of times to produce a selected number of successive layers. The further material causes the successive layers to become bonded to each other to form the inner shell and the skeletal elements of the support body. The method also includes the step of removing unbonded powder material which is not at the one or more selected regions, to form the cavity and voids between the skeletal elements. The powder is removed through passageways that exist between the voids and the outside of the mold. Molding material is introduced to the inner shell through a passage provided for this purpose.

According to one aspect of this embodiment of the invention, the model of the mold comprises a rectilinear cellular body defined by substantially parallel planar stories.

The repeated step of depositing a layer of powder material may comprise depositing a layer in a plane that is either substantially parallel to or oblique to the substantially parallel stories.

A related aspect of such an embodiment includes providing a model of skeletal elements arranged to provide a predetermined pattern of heat transfer from any casting material as it cools to form a part to be made with the mold, which heat transfer varies at different locations in the pattern.

In accordance with various preferred embodiments of the invention, the free form layered fabrication technique may be any of: Three Dimensional Printing, Selective Laser Sintering, Stereo Lithography, CAM-LEM, Fused Deposition Modeling and Ballistic Particle Manufacturing.

The method of making a mold also includes providing a model having skeletal elements sized, shaped and spaced as described above, to ensure that the mold will support the molding material as it is poured into the cavity, and so that it will also fail as the molding material solidifies and cools, to avoid its damage.

Still another preferred embodiment of the invention is a method of molding a part. The method comprises the steps of providing a mold that has an inner shell and a support body, according to any of the embodiments described above, made according to any of the methods described above. The method further entails providing liquid molding material in the cavity and maintaining the mold under conditions such that the molding material solidifies into the part; and such that the solidified part and the mold cools. The method further requires maintaining the shell and supporting body such that both fail at predetermined regions relative to the locations of features of the casting part, as the molding material experiences dimensional change, and such that the molding material deforms less than its yield strain as it solidifies and cools. Finally, the failed mold is removed from the solidified, cooled part.

In a preferred embodiment, the method of providing the mold is a method of providing layers of powdered material, as described above. Typically, the powdered material is a ceramic material, and the molding material is a metal.

The mold will typically fail before any features of the casting if certain requirements are met. In a specified region of the support body, adjacent where a feature of the casting has a linear dimension D, the skeletal elements comprise struts, each strut having a length L, a cross-sectional area of $b^2$, and a neutral axis located a distance h from a surface of the strut which is under maximum tensile load. If the strut is made from a material having an elastic modulus E, and if they are spaced from adjacent struts a distance w, and if the relative strain between the casting material and the thin shell is $\varepsilon_R$, then the struts should be sized and spaced such that the tensile breaking strength of the struts is less than, $$\frac{6Eh}{L^2} * \frac{\varepsilon_R D}{2},$$

to ensure failure. For square struts, this reduces to the maximum tensile breaking strength of the struts being less than.

$$\frac{3Eb}{L^2} * \frac{\varepsilon_R D}{2}.$$

Yet another embodiment of the invention is a mold comprising a thin inner shell that defines a three dimensional cavity; and a three-dimensional foraminous support body that is contiguous with and substantially surrounds the inner shell. The support body comprises skeletal elements with voids therebetween, the voids comprising a network having an open pathway from each void to outside the support body, the skeletal elements and voids arranged to provide a predetermined pattern of heat transfer from any casting material as it cools to form a part to be made with the mold, which heat transfer varies at different locations in the pattern. The skeletal elements may be struts, lattice elements, sheets, or any combination thereof. They may be arranged to impede the transfer of heat from the casting material or to direct the transfer of heat from the casting material along a predetermined path. The sheets may be arranged as radiation or convection shields. The thermal control mold of the invention may also include any of the other geometrical features discussed above.

Still another preferred embodiment of the invention a method of making a mold, using a solid free form layered fabrication technique. The method comprises the steps of providing a machine readable model of a mold geometry as described immediately above, with the heat control properties enumerated.

BRIEF DESCRIPTION OF THE DRAWINGS

These and other features, aspects, and advantages of the present invention will become better understood with regard to the following description, appended claims and accompanying drawings, where:

FIG. 11 is a schematic representation of an open top, tub-like mold embodiment of the invention for fabricating a modified, flat-faced dumbbell-shaped casting;

DETAILED DESCRIPTION

Figure 1:
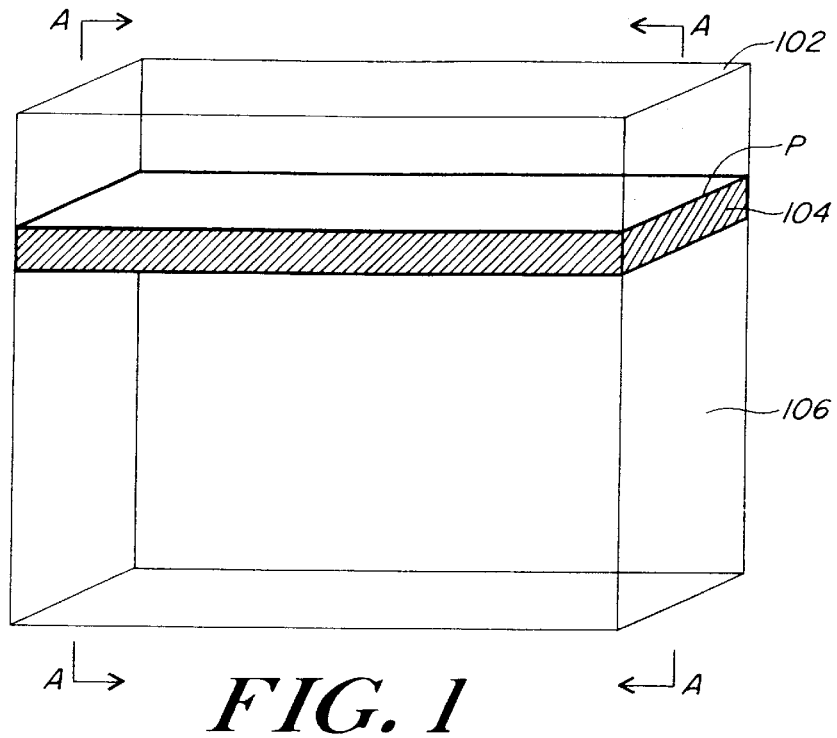
FIG. 1 is a schematic representation showing the interfaces between a casting and a thin mold shell that supports the casting, and a supporting structure that in turn supports the thin shell.
Figure 1A:
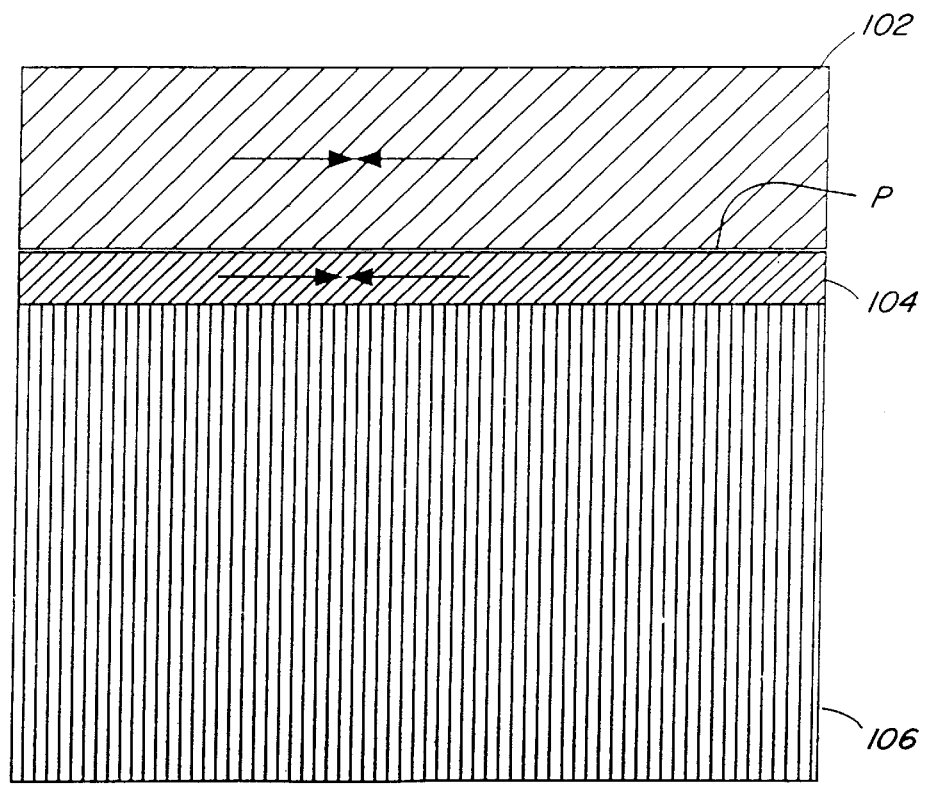
FIG. 1A is a schematic view in cross-section of the interfaces between a casting and a thin mold shell shown in FIG. 1, along the lines A—A.
Figure 2:
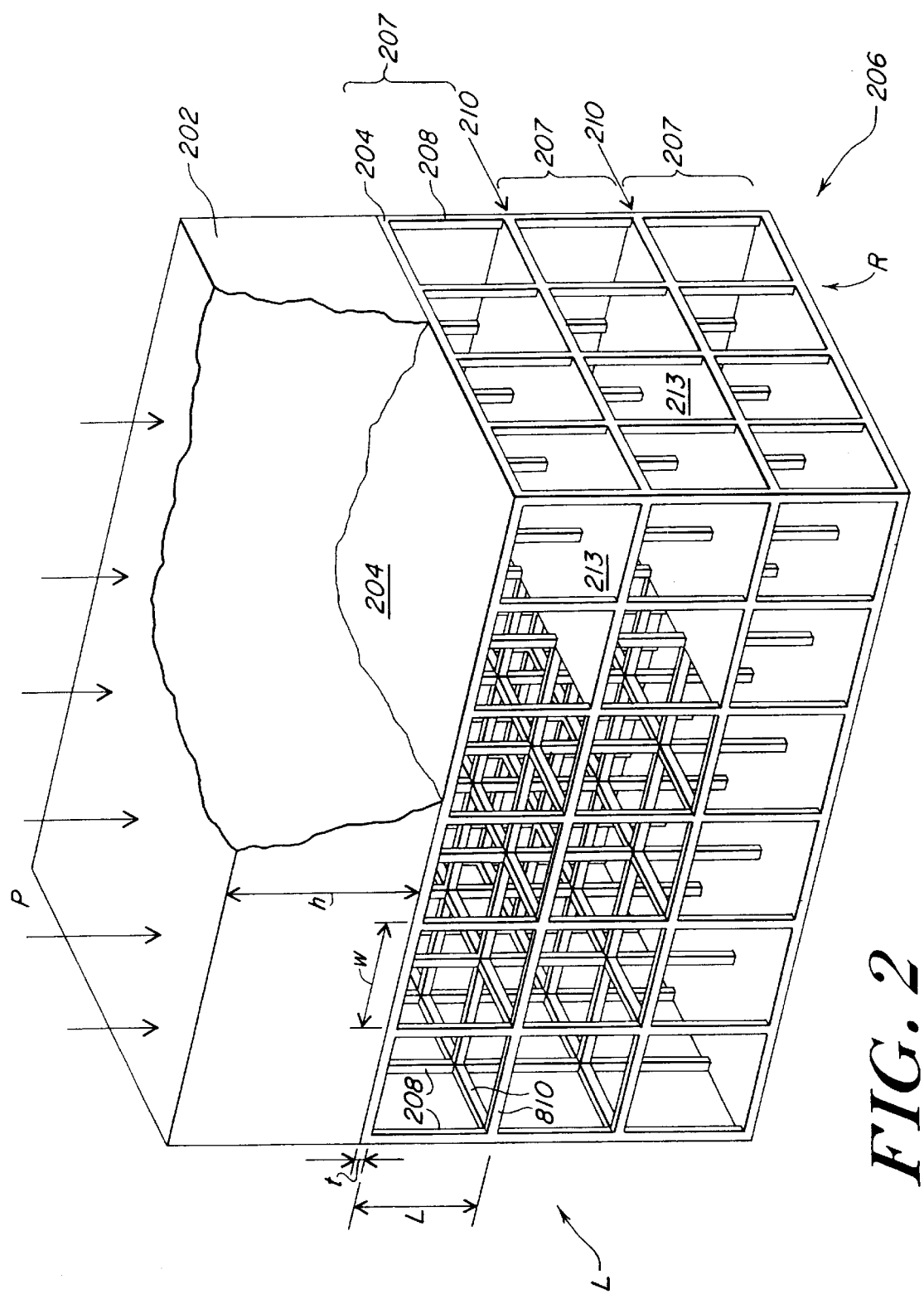
FIG. 2 is a schematic representation of a thin shell and support structure, as loaded hydrostatically during the pouring of casting material into a mold cavity, showing also open sided, edge based cellular primitive according to an embodiment of the invention, of which the support structure may be built in whole or in part.

A preferred general embodiment of the invention is shown schematically with reference to FIGS. 1, 1A and 2. In general, an embodiment of the invention contemplates that a mold will be fabricated using a Solid Freeform Fabrication (SFF) process, which allows parts to be created directly from computer models. SFF processes that are commonly used include Three Dimensional Printing ("3D Printing") stereolithography ("SLA"), selective laser sintering ("SLS"), CAM-LEM, a variant of laminated object manufacturing ("CAM-LEM"), Ballistic Particle Manufactoring ("BPM") and fused deposition modeling ("FDM"). These processes all differ from traditional machining, since material is added to the desired part, as opposed to material being removed, as with milling, turning, and boring.

Three dimensional printing uses powders and is described in general in numerous patents, including: U.S. Pat. No. 5,204,055, entitled THREE-DIMENSION PRINTING TECHNIQUES, by Sachs, Haggerty, Cima, and Williams; U.S. Pat. No. 5,340,656, entitled THREE-DIMENSION PRINTING TECHNIQUES, by Sachs, Haggerty, Cima, and Williams; U.S. Pat. No. 5,387,380, entitled THREE-DIMENSIONAL PRINTING TECHNIQUES, by Cima, Sachs, Fan, Bredt, Michaels, Khanuja, Lauder, Lee, Brancazio, Curodeau, and Tuerck; U.S. Pat. No. 5,490,882, entitled PROCESS FOR REMOVING LOOSE POWDER PARTICLES FROM INTERIOR PASSAGES OF A BODY, by Sachs, Cima, Bredt, and Khanuja; U.S. Pat. No. 5,660,621, entitled BINDER COMPOSITION FOR USE IN THREE-DIMENSION PRINTING, by James Bredt; U.S. Pat. No. 5,775,402, issued Jul. 7, 1998, entitled ENHANCEMENT OF THERMAL PROPERTIES OF TOOLING MADE BY SOLID FREE FORIYI FABRICATION TECHNIQUES, by Allen, Michaels, and Sachs; U.S. Pat. No. 5,807,437, issued on Sep. 15, 1998, entitled HIGH SPEED, HIGH QUALITY THREE DIMENSIONAL PRINTING, by Sachs, Curodeau, Fan, Bredt, Cima, and Brancazia; U.S. Pat. No. 5,814,161, issued on Sep. 29, 1998, entitled CERAMIC MOLD FINISHING TECHNIQUES FOR REMOVING POWDER, by Sachs, Cima, Bredt, Khanuja, and Yu; and U.S. Pat. No. 5,940,674, issued on Aug. 17, 1999, entitled THREE DIMENSIONAL PRODUCT MANUFACTURE USING MASKS, by Sachs and Cima. All of the foregoing 3D Printing patents are incorporated herein fully by reference.

3D Printing is also disclosed and discussed in co-pending, applications, including: U.S. Ser. No. 08/856,515, filed May. 15, 1997, entitled CONTINUOUS INK-JET DROPLET GENERATOR, by Sachs and Serdy; U.S. Ser. No. 60/060,090, filed Sep. 26, 1997, entitled REACTIVE BINDERS FOR METAL PARTS PRODUCED BY THREE DIMENSIONAL PRINTING, by Sachs, Yoo, Allen, and Cima (provisional application); U.S. Ser. No. 60/094,288, filed Jul. 27, 1998, entitled METHOD OF MAKING INJECTION MOLDS HAVING COOLING CHANNELS THAT ARE CONFORMAL TO THE BODY CAVITY, by Xu and Sachs (provisional application); U.S. Ser. No. 09/445,670, filed Dec. 9, 1999, entitled JETTING LAYERS OF POWDER AND THE FORMATION OF FINE POWDER BEDS THEREBY, by Sachs, Caradonna, Serdy, Grau, Cima, and Saxton, which is the national phase of PCT application PCT/US98/12280, filed Jun. 12, 1998, published on Dec. 17, 1998; and U.S. Ser. No. 09/509,284, filed Mar. 23, 2000, entitled METAL AND CERAMIC CONTAINING PARTS PRODUCED FROM POWDER USING BINDERS DERIVED FROM SALT, by Sachs, Hadjiloucas, Allen, and Yoo, which is the U.S. National Phase of PCT application PCT/US98/20129, filed Sep. 25, 1998, published on Apr. 1, 1999. All of the foregoing 3D Printing patent applications (and provisional applications) are incorporated herein fully by reference.

A typical implementation of the 3D Printing process begins with the definition of a three-dimensional geometry using computer-aided design ("CAD") software. This CAD data is then processed with software that slices the model into many thin layers, which are essentially two-dimensional. A physical part is then created by the successive printing of these layers to recreate the desired geometry. An individual layer is printed by first spreading a thin layer of powder and then printing binder to adhere the powder together in selected regions to create the desired layer pattern. The growing part is lowered by a piston and a new layer of powder is spread on top. This process is repeated until all the layers have been printed. The binder joins powder together within a layer and between layers. After printing is complete, the unbound powder is removed, leaving a part with the desired geometry. Typically the part is a green part that will experience further processing, such as sintering. However, in some circumstances, the part may be a final part.

There are many different powder and binder systems, based on metal, or ceramic or polymer powder. The part can be sintered or infiltrated to full density. Because 3D Printing is an additive manufacturing process, many geometries are possible that are not feasible with traditional machining, such as undercuts and internal cavities. Furthermore, many materials can be used in the 3D Printing process, as long as they can be obtained in powdered form. Currently, work has been done using metal, polymer, ceramic, and glass-ceramic powders. Using these materials, a wide variety of parts have been produced. This includes, injection molding tooling, casting shells, and structural ceramics. Parts, such as tooling, can incorporate cooling channels that are conformal to casting surfaces to decrease cycle time and residual stresses in parts made with such tooling. Other types of parts can also include such channels. Using the 3D Printing process, it is also possible to make individual parts with regions composed of varying materials (functionally gradient materials). This can be achieved by printing different materials into selected regions of an individual layer. This extra degree of freedom allows designers to vary the material properties within a single part.

The other SFF techniques have various properties, advantages and disadvantages, which are generally known. See generally, Prinz, F. B. et al, JTEC/WTEC PANEL REPORT ON RAPID PROTOTYPING IN EUROPE AND JAPAN, Volume 1, Analytical Chapters, Rapid Prototyping Association of the Society of Manufacturing Engineers, Baltimore, Md.: Loyola College, Mar. 1, 1997, which is incorporated herein by reference. The following discussion uses 3D Printing to illustrate the general principals of the embodiments of the invention. However, the other SFF techniques can also be used. Some important features that are specific to others of these techniques are discussed below, after the general discussion of the embodiments of the invention.

In general, the present invention solves the problems that arise from the differential changes in geometry inherent to casting metal in a ceramic mold, by control of the internal morphology of the ceramic mold. By "internal morphology" it is meant, between the surfaces of the mold that face the casting, and that face the external environment. Specifically, layered fabrication techniques are used to create a ceramic mold. Control may be exercised, not just over the geometry of the inner and outer walls of the mold themselves, but also of the morphology of the structure between the walls. For example, an internal geometry composed of a cellular arrangement of voids may be created within the mold wall. Through such control of the internal morphology, structures may be designed and fabricated such that the ceramic mold is virtually guaranteed to fail at an appropriate time during the solidification and/or cooling of the casting. Thus, the casting itself is not damaged.

As used herein, in the context of the mold, "to fail" means to break, rupture or bend past an elastic limit. If a structure "fails" under a loading condition, it will not return to its original form after the loads are removed. The goal of the present invention is to design and control the mold to fail (break, rupture or bend past an elastic limit) and thus to avoid rupture, or even distortion, of the casting.

Such collapsing molds typically consist of a thin layer of ceramic, which defines the casting cavity. This layer must be thin enough to fail due to the stresses induced (primarily compressive) by the metal next to it and partly adherent to it. Such a thin layer, however, would not be strong enough to be manipulated, handled or to enable transport of the mold before use, or to withstand the pressure and forces of the molten metal during pouring of the casting. Thus another aspect of the present invention is to design a support structure with a morphology that supports the thin wall that defines the casting geometry, yet that also fails as the casting solidifies and/or cools.

At least the following two failure mechanisms may be used in the design of the support structure. In one case, a support structure may be designed so that the difference in contraction of the casting relative to contraction of the ceramic mold induces bending in the structure, thereby causing the mold to fail. Alternatively, a support structure may be designed so that it fails under compressive loads, either by buckling of a support member or, more likely, by the breakage of the member under the compressive loading. The breakage of the support structure may also be due to a combination of bending and compression.

Bending, compression, and buckling are three distinct and useful modes of breakage. There are also other useful modes. The present disclosure should not be taken to be limited only to bending, compression, and buckling. Other such useful modes include tensile failure and torsional failure.

Inner Shell Design

The thin inner shell defines the geometry of the casting. The thin shell must, thus, be impervious to the flow of liquid molding material. (This inner shell is porous to a degree. Molten metal does not penetrate it because it does not wet the ceramic.) Further, the thin inner shell must not restrain the casting as it cools. If the shell defines only the external boundary of a casting, such as with a simple shape, the casting may simply shrink away from the shell and the shell might not fail in such cases. However, for most geometries, some parts of the shell will be placed in compression by the casting. Further, the shell will often adhere in some places to the casting and will be pulled along with it at those points of adherance. Thus, in general, the shell must be designed to crush under compressive loading or buckle and collapse as the casting cools.

Design Considerations to Ensure that Inner Shell Fails During Cooling

It is instructive to first consider the case of the shell that is lightly adhered to the casting as shown in FIGS. 1 and 1A. For simplicity, a planar surface of the casting 102, with the thin shell 104 on it, will be examined. However, it should be understood that the shell need not be planar, and can be a curved surface. Further, it will be assumed that the ceramic shell 104, being thin, moves with the casting 102. That is, as the casting 102 contracts, the shell 104 contracts with it and the elastic strain in the shell is the difference between the shrinkage of the casting and the thermal shrinkage strain of the shell.

In keeping with the analysis described Gibson and Ashby, *Cellular Solids,* Cambridge University Press, First paperback edition, p. 293 (1999) ISBN# 0-521-49911-9, one sees that the shell is under plane stress loading conditions and the stress developed in the shell can be found to be related to the strains in the casting and the shell as follows:

$$\sigma_s = \frac{(\varepsilon_c - \varepsilon_s) * E_s}{1 - v_s}, \quad (1)$$

where subscripts s and c represent the shell and the casting, respectively, σ is stress, ε is strain, E is the Elastic modulus and ν is the Poisson ratio.

The difference between the strain in the casting $\varepsilon_C$ and the strain in the shell $\varepsilon_S$ is the relative strain $\varepsilon_R$. This relative strain, $\varepsilon_R$, is made up of two components: one due to the volume change upon solidification and the other due to the difference in contraction upon cooling. Taking a conservative value for this relative strain, based on only the difference in contraction upon cooling, a value on the order of 1% can be taken, as discussed in the background section above. Thus the numerator term in parenthesis in the equation above may be taken to be 0.01. The elastic modulus of porous materials may be estimated from the modulus of the bulk material and the volume fraction of material as described in *Cellular Solids* by Gibson and Ashby, above, p. 189. For alumina, with a volume fraction of 40%, the modulus is calculated as approximately 50 GPa. The Poisson ratio of the porous shell is difficult to estimate, but necessarily lies between 0 and 0.5. Thus, the stress in the shell under the conditions stated may be calculated as lying between 500 and 1000 MPa.

Typically, the porous ceramics used to make molds have tensile breaking strengths of 5–20 MPa and compressive breaking strengths of 20–100 MPa. (Compressive strengths for ceramics are generally substantially higher than tensile strengths.) Thus, the ceramic shell 104 will crush under compression long before the casting 102 has cooled to room temperature. This is the desired result.

The above analysis examined the worst case of the shell being loaded in compression and found that it will still fail as the casting cools. In some cases, for example, where the shell remains only partially attached to the casting as it cools, the shell will be subjected to bending stresses and perhaps to tensile stresses. These stresses will be even more likely to cause failure of the shell than compressive stresses. Bending stresses are quite large and the ceramic shell is weaker in response to tensile stresses. Such partially attached shells may also fail in buckling rather than compression, as relatively long and thin members tend to buckle rather than crushing.

Thus, if the shell 104 that defines the geometery of the casting 102 can be thin, the shell 104 will fail after only a small temperature change of the casting 102. One consideration that limits the thinness of the shell 104, is that it must be possible to fabricate it. For typical printing parameters in Three Dimensional Printing and other types of SFF, layer thicknesses of 100–200 microns are common. In such cases, shells of wall thickness ranging from 0.5–5 mm (5–25 layers) are reasonable. The thinner shells would be applicable to smaller castings and thin walled castings.

Support Structure

In order to guarantee the failure of the thin ceramic shell 104 during cooling of the casting 102, the shell is made to be thin. However, because it is thin, it cannot support substantial hydrostatic stress due to pouring the molten metal, unless some backup support 106 is provided. This backup support 106 may be in the form of struts or a cellular structure, for example. In general, the structure may be characterized as foraminous, having skeletal elements, with voids therebetween. The skeleton and voids may be regular or irregular. The voids must be arranged to permit the removal of unbound material therefrom during manufacture of the mold. In 3D Printing, the unbound material is powder. In stereolithography, the unbound material is liquid. The voids can be empty, or filled with a weaker material, such as foam. If the voids are not empty, any material filling them should have a modulus of elasticity that is substantially less than that of the skeletal elements such that as the skeletal elements deform, very little load is taken up by any filler material.

Design Considerations to Ensure that Inner Shell does not Fail During Mold Filling FIG. 2 is a rendering of a three-dimensional support structure, with a charge of molten molding material 202 supported thereby. A portion of the molding material is removed for illustrative purposes. As shown with reference to FIG. 2, an estimate of the maximum interval $w_{max}$ of the thin shell structure between skeletal supports 208 that are aligned substantially perpendicular to the plane of the thin shell 204 may be calculated by assuming the thin shell 204 to be a plate, subject to uniform loading, due to the hydrostatic pressure. Assuming that the edges of the thin shell 204 are fixed, the maximum stress $\sigma_{max}$ in the thin shell may be calculated (taken from *Roark's Formulas for Stress and Strain,* Warren Young, McGraw Hill, 1989, page 464, ISBN 0-07-072541-1) as:

$$\sigma_{max} = \frac{0.31 * P * w^2}{t^2}, \tag{2}$$

where P is the hydrostatic pressure, w is the lateral extent of a segment of the thin shell 204 between supports 208 and t is the thickness of the shell.

The maximum stress $\sigma_{max}$ must not exceed the minimum tensile breaking stress of the thin ceramic shell 204. This breaking stress depends on the composition of the thin shell, notably, for 3D Printing, the size of the powder particles and the binder used to hold the powder particles together. The strength also depends on the processing of the shell, especially on the firing temperature of the shell. Typically, with thin ceramic shells made by Three Dimensional Printing, alumina powder in the size range of 10–50 microns is bound by silica derived from colloidal silica. The shell is fired at temperatures ranging from 900–1400° C. and can have tensile breaking strengths ranging from 5 to 20 MPa.

The hydrostatic pressure P may be calculated as follows:

$$P=\rho g h, \tag{3}$$

where $\rho$ is the density of the molten metal 202 being cast, g is the acceleration of gravity, and h is the height of the molten column.

For example, for a one meter column of a steel alloy, as would be typical, (h=1) the hydrostatic pressure may be found to be 75,000 Pascal.

Taking a hydrostatic pressure of 75,000 Pa, and a thin shell 204 of thickness t of 1 mm, one can calculate the extent of the shell, that will result in a maximum stress equal to 5 MPa (the lower range of breaking stress of the ceramic shell material). Using equation (2) it can be shown that w, the lateral extent of the shell, is equal to 15 mm. Thus, if the supports 208 are spaced closer than 15 mm, the thin shell 204 will be able to withstand the loading due to the hydrostatic pressure. Equation (2) can be similarly used to calculate maximum support spacing for other thicknesses of shell 204, other shell material strengths and other hydrostatic loading conditions. Some safety factor might also typically be applied by assuming that the breaking strength is lower than the anticipated value.

Further, it should be noted that the boundary conditions assumed for the segment of shell (fixed edges were assumed above) will change the value of the constant in equation (2) from the value given of 0.31. This analysis is presented as representative of the approach to be used in design of the shell.

Design Considerations to Ensure that Support Structure does not Fail During Mold Filling

Resistance of Support Structure Elements to Compression

One must design the support struts 208 or other skeletal elements so that they do not themselves break or otherwise fail under the compressive loading due to hydrostatic pressure. The compressive strength of ceramics is typically much higher than the tensile strength, due to the sensitivity of tensile failure to small flaws that are frequently present in ceramics. For an estimate, the compressive strengths will be taken to be five times the tensile strengths. Thus, a ceramic that has a range of tensile strengths of 5–20 MPa, will have a range of compressive strengths of 25–100 MPa.

In general, the breaking load a strut can take is given by the compressive strength of the material, times the cross sectional area A of the strut (which is equal to $b^2$).

$$Breaking\ Load = Compressive\ Strength * A. \tag{4}$$

The load due to the hydrostatic pressure of the liquid metal for one strut is:

$$Load\ due\ to\ Pressure = Pouring\ Pressure * w^2. \tag{5}$$

It is desired that the load due to hydrostatic pressure be less than the breaking load of a strut 208. Equating these two loads, results in a minimum ratio of the square root, b, of the area of a strut, divided by the span w between struts, as follows:

$$\left.\frac{b}{w}\right|_{min} = \left(\frac{Pouring\ Pressure}{Minimum\ Compressive\ Strength}\right)^{1/2}. \tag{6}$$

The minimum value of the compressive strength expected in the ceramic has been used to predict the minimum value required of the ratio b/w to guarantee that strut failure does not occur prematurely, during pouring. For a ceramic with a minimum compressive strength of 25 MPa, and a pouring pressure of 75,000 Pa, this results in: b/w~0.05. As long as the ratio b/w exceeds this value, the struts 208 in the support structure 206 will not fail in compression. Thus, for example, if the spacing w between struts 208 is 15 mm (w=15 mm), and the cross sectional dimension b of the strut exceeds 0.75 mm, the struts 208 will not fail due to the compressive stress during pouring.

Resistance of Support Structure Elements to Buckling

The struts 208 must also be designed to avoid failure due to buckling during pouring. Buckling is a condition of instability that arises when the load on a column, for example, exceeds a critical loading and the column undergoes a large deflection laterally (*An Introduction to the Mechanics of Solids,* Crandall et all, McGraw Hill, pp. 589–590, 1978, ISBN 0-07-013441-3). At the critical buckling load, this lateral deflection increases catastrophically.

The buckling load for a strut 208 with constrained end supports (i.e., the angle of the ends is fixed) is given by:

$$Buckling\ Load = \frac{4\pi^2 EI}{L^2}, \tag{7}$$

where I is the moment of inertia of the strut, L is the length of the strut, and E is the elastic modulus of the strut material.

For a square strut of area A and cross sectional dimension b, $$Buckling\ Load = \frac{\pi^2 E b^4}{3L^2}. \tag{8}$$

Typically, the struts that might practically be fabricated will be fairly resistant to buckling and will break in compression before they break in buckling. For example, struts of ceramic, with modulus E=50 GPa, which are 1 mm in cross section and 10 mm long, will not buckle at loads of less than approximately 1600 Newtons. Such columns fabricated of ceramic with compressive strengths of 125 MPa will break in compression at 125 Newtons. Thus, for most cases, columns that are strong enough to avoid breakage in compression, will also avoid breakage in buckling.

Design Considerations to Ensure that Support Structure Elements Fail During Cooling The foregoing discusses design considerations to ensure that the mold support structure does not fail prematurely, before the casting solidifies, due to stresses that arise during mold filling. The following discusses design considerations to ensure that the mold support does indeed fail as the casting cools, to prevent damage to the casting. There are several ways in which the support structures can fail, including, but not limited to, struts bending and struts crushing under compression.

Design of Support Structure for Intentional Failure by Bending

As shown with reference to FIG. 3, the thin shell 304, which defines the outer geometry of the casting 302, can be supported by column-like skeletal support structures 308, which are also designed to fail due to stresses induced during cooling of the casting. It is useful to intentionally design these columns to purposely fail by one or both of two distinct mechanisms: bending or crushing. By designing the columns to fail by either or both of these mechanisms, before damage to the casting can take place, maximum protection is provided for the casting.

Figure 3A:
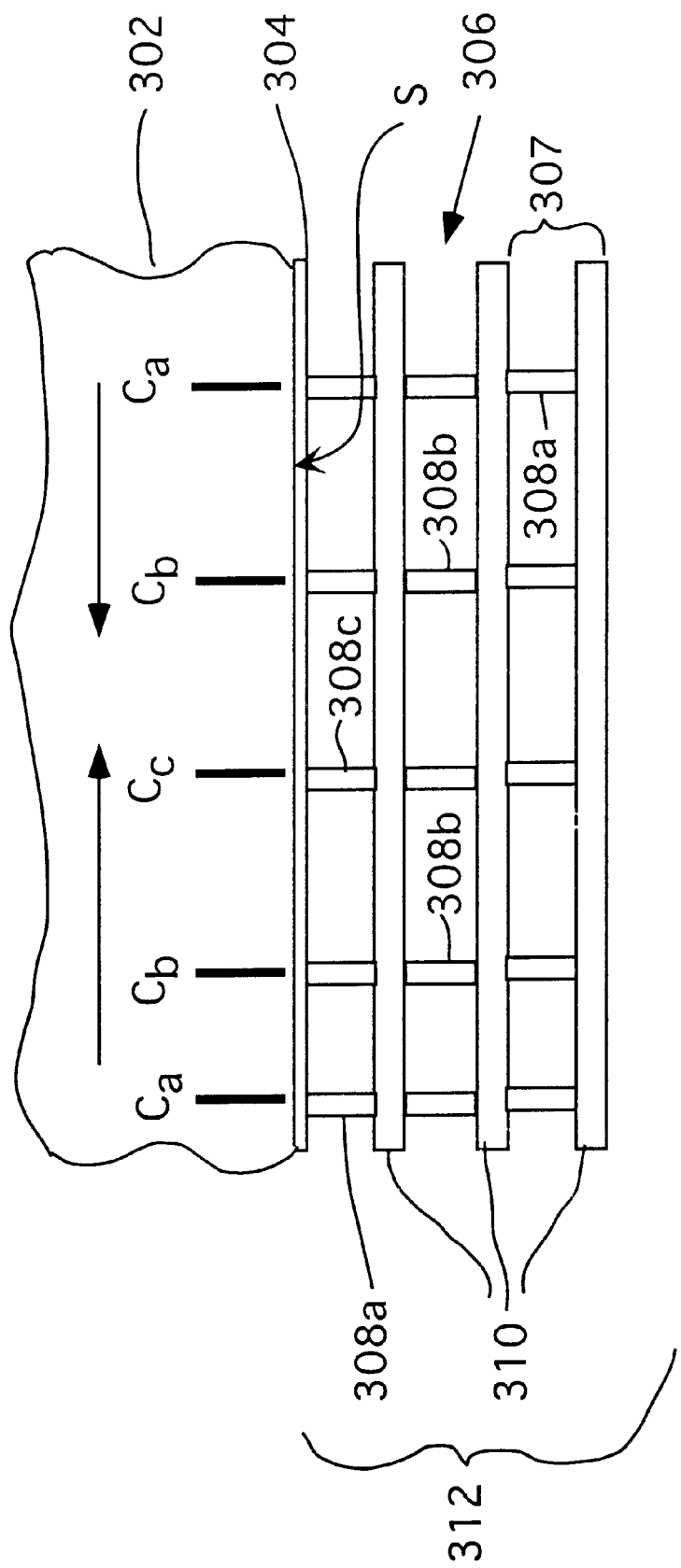
FIG. 3A is a schematic representation in an elevation view of a portion of a mold and casting, immediately after the cavity is charged with casting material.

In many geometries, the relative shrinkage of the casting and the shell will result in establishing shear strain within the shell. For example, FIG. 3A shows a planar surface of a casting 302 and the mold 312 immediately after pouring, before solidification of the casting.

Figure 14:
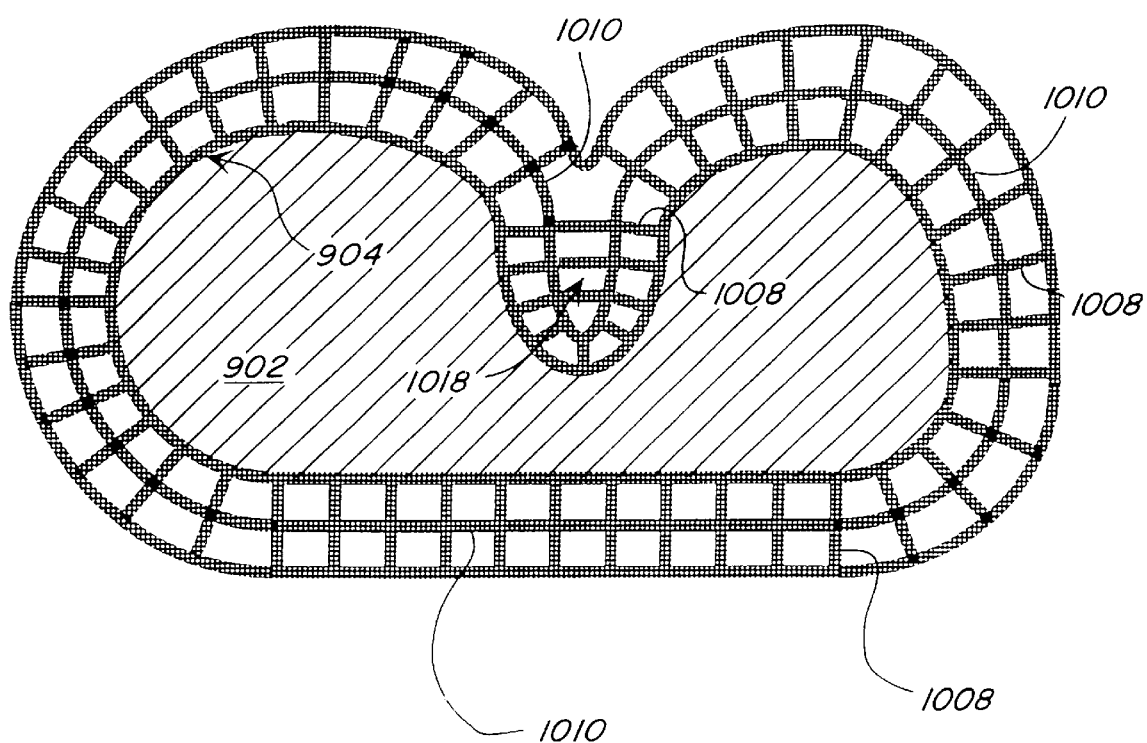
FIG. 14 is a schematic representation in cross-sectional view of a portion of a mold, including a non-rectilinearly arranged support structure, for fabricating a casting as shown in FIG. 12.

The mold is made up of the thin shell 304, which directly supports the poured metal 302. The thin shell 304, is, in turn, supported by a support structure 306, made up here by spaced struts 308 and spaced courses 310. Together, a set of struts 308 and a course 310 make up a story 307 much as the vertical wall studs and floor components constitute the skeleton for a story of a building. By "course," it is meant all of the elements that constitute a foundation for a story of struts. As is discussed in more detail below, the support structure 306 is three dimensional, and only a cross-section is shown in FIG. 3A. There would also be struts 308 spaced along a dimension into and out of the plane of the figure. FIG. 2 is a rendering of a three-dimensional support structure, made up of linear struts 208 that are substantially perpendicular to the local plane of the shell 204, lattice members 810 that are substantially parallel to the local plane of the shell 204, and sheets 213. The struts may extend along different angles, depending on the geometry of the casting rather than all being parallel, as shown in FIG. 3A. Further, the courses can be many different configurations, as shown 210 in FIG. 2, including solid sheets 213, like finished floors in a building, open lattice elements 810, like floor joists before continuous floor surface is applied, or like bars in an open lattice, or any combination thereof. Further, the stories 307 are shown generally as planar in FIG. 3A. However, they need not be. For instance, as shown in FIG. 14, they have curved portions, somewhat analogous to a layer of an onion. This is discussed in more detail below. FIG. 2 shows three stories 207, each composed of a course 210, and struts 208. The courses include both sheets 213 and lattice members 810.

In general, a story is a set of cells, like a story of a building is a set of rooms. The cells are defined by the struts 308 and the coursed 310 (208, 210). The courses can be generally planar, or curved, and the struts can be arranged regularly or irregularly, as discussed below.

The fiducial marks $C_a$, $C_b$ and $C_c$ are displayed herein only to establish reference locations within the metal casting, as it undergoes solidification, and cooling. They do not represent any physical structure.

Figure 3B:
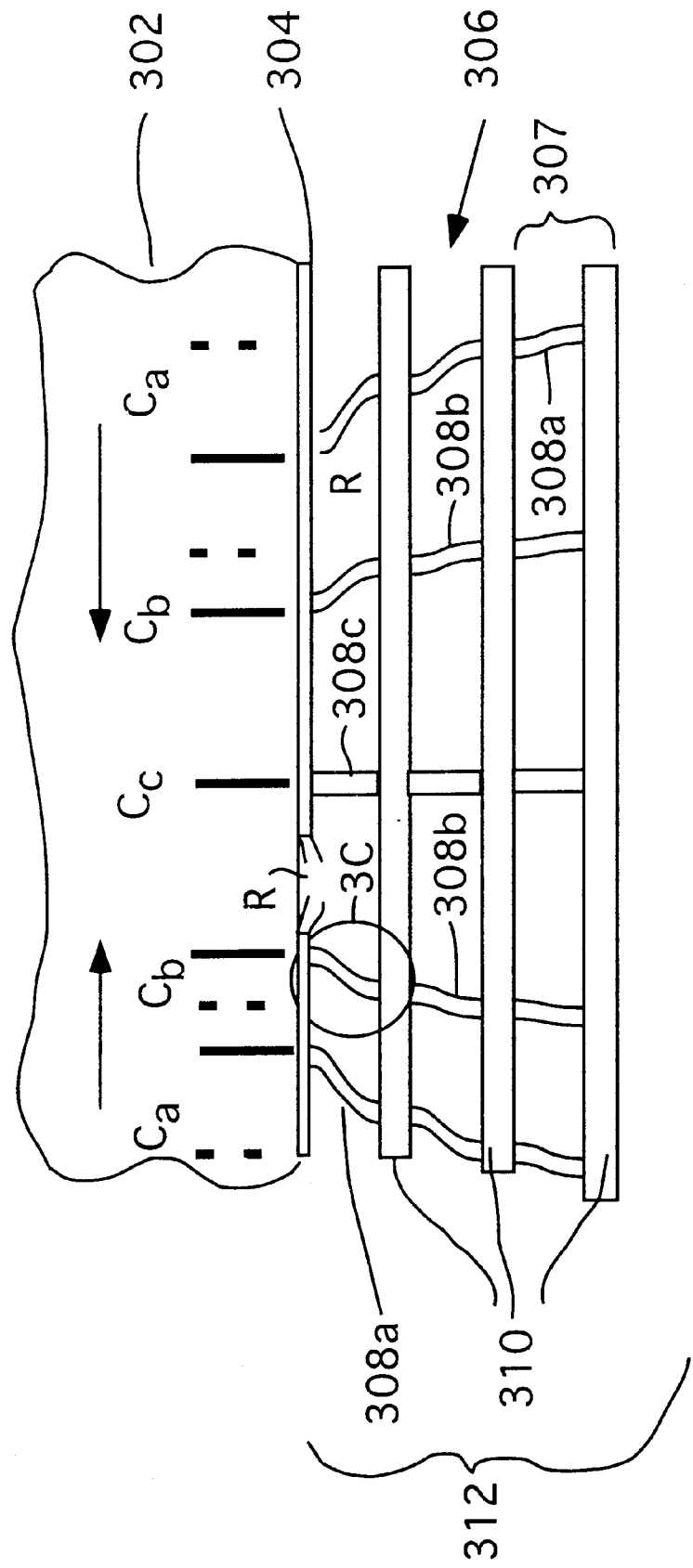
FIG. 3B is a schematic representation of the portion of a mold and casting shown in FIG. 3A, as the casting solidifies and then cools, causing shear stresses to arise in the mold.

FIG. 3B shows the same structure after solidification and, possibly, some cooling of the casting 302. The mold 312 is forced to move with the casting 302, either because of adhesion between the casting and the mold or because of a constraining geometric feature outside the boundary of the figure, that compresses the mold. The columns 308 are subject to bending due to the shear. This bending establishes tensile stresses on the convex side of the bend (indicated by a T) (FIG. 3C) and compressive stresses (indicated by a C) on the concave side of the bend. The thin shell 304 is shown to have ruptured at R. The column $308_c$, adjacent the fiducial $C_c$, is not shown to be bending, because it is taken as an ideal center toward which the surrounding structures are compressing. The columns $308a$ are shown to be bending more than $308b$ at fiducials $C_b$, as this would likely be the case. One of the struts $308a$ is also shown to have broken.

In the design of such support columns, advantage is taken of the fact that ceramics can tolerate a substantially higher load in compression than in tension. Thus, the support columns 308 are loaded in compression when the mold is filled with liquid metal, and they do not fail. But as the casting solidifies, cools and shrinks, bending stresses arise in the columns 308 and failure will take place at the tensile side of the columns. Specifically, the maximum tensile stress will occur at the base of the columns on the tensile side at location X (FIG. 3C).

Figure 3C:
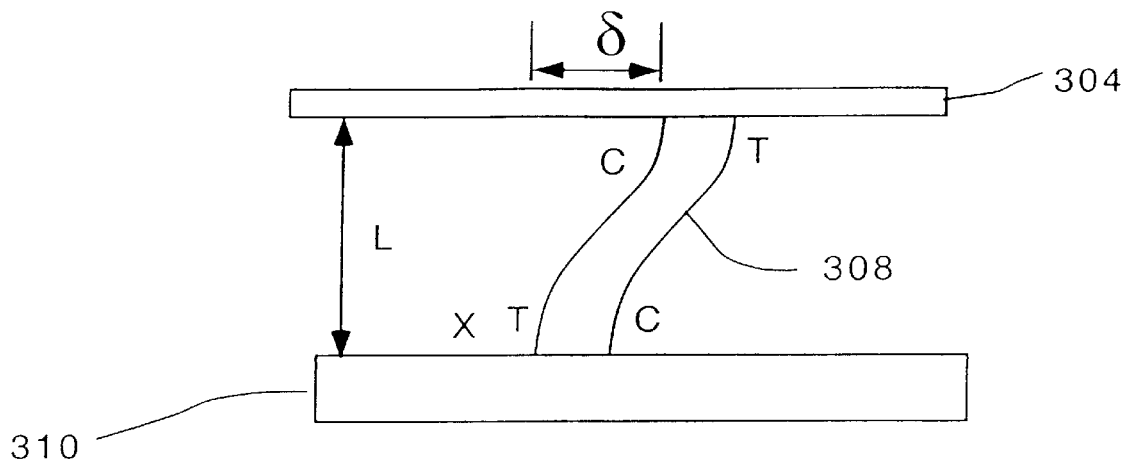
FIG. 3C is an enlarged view of the region C shown in FIG. 3B.

Further, assuming that the strut deflects laterally an amount δ as it bends under the constraint that the angle at the ends does not change (as shown in FIGS. 3B and 3C) an approximate level of maximum tensile stress in the struts can be determined as:

$$\text{Stress} = \frac{6Eh}{L^2}\delta, \tag{9A}$$

where it has been assumed that the strut has a length L, an elastic modulus E, and where h is the distance from the neutral axis of the strut to the surface of the strut which is under maximum tensile loads.

For the case of a square strut with side b, length L and elastic modulus E, equation 9A may be restated as:

$$\text{Stress} = \frac{3Eb}{L^2}\delta. \tag{9B}$$

The elastic modulus E of porous materials may be estimated from the modulus of the bulk. As noted above, for alumina, with a volume fraction of 40%, the modulus is calculated as approximately 50 GPa. For square struts of side 1 mm (b=1 mm) and length 10 mm (L=10 mm), for a material with a maximum tensile breaking strength=25 MPa, one can calculate that the deflection δ of the strut that will cause a fracture, is approximately 15 microns. In other words, if the strut is caused to displace laterally δ by 15 microns or more by the shrinkage of the casting, the strut will break and will not thereafter exert a force on the casting that could distort or tear it.

Figure 3D:
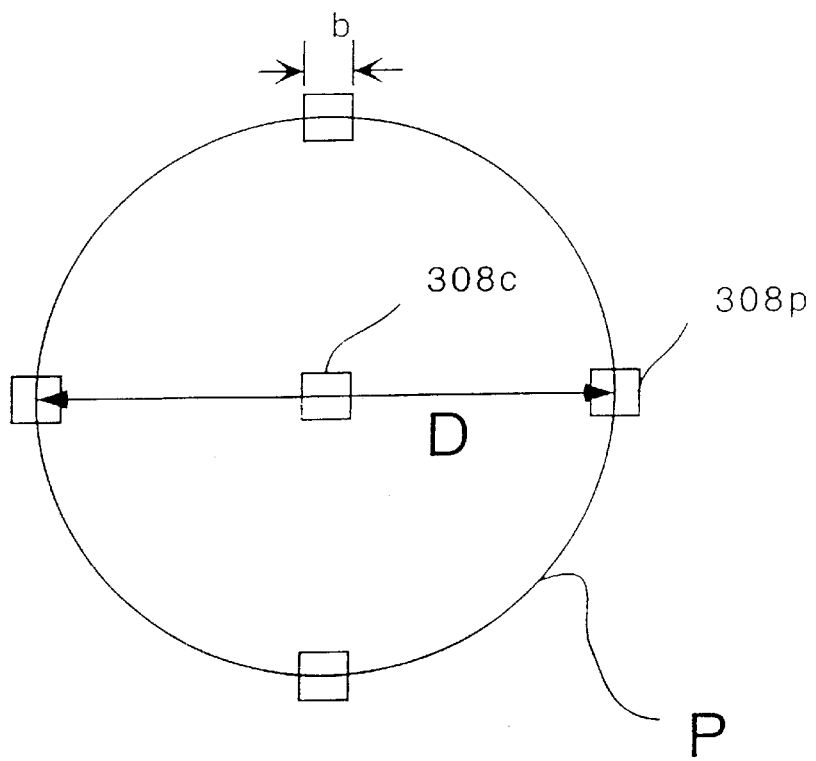
FIG. 3D is a plan view of a circular region of a thin shell, showing the footprint of support columns from the support structure.

The magnitude of the deflection of the struts caused by the difference in contraction the casting relative to the shell can be estimated by examining a small planar circular area of diameter D as show in FIG. 3D. If it is assumed that there is no bending of the strut 308 at the center of the circle, one can calculate the shear displacement (and therefore deflection of the struts 308) at the perimeter of the circle as:

$$\delta = \frac{\varepsilon_R D}{2}, \quad (10)$$

where δ is the shear displacement, and $\epsilon_R$ is the relative strain, as defined above.

Thus, the stress that the strut will experience, in the general case, is:

$$\text{stress} = \frac{6Eh}{L^2} * \frac{\varepsilon_R D}{2}. \quad (11A)$$

For the case of the square strut, mentioned above, Eq. 11A may be restated as:

$$\text{stress} = \frac{3Eb}{L^2} * \frac{\varepsilon_R D}{2}. \quad (11B)$$

The strut will fail, and the mold will fail, if the maximum stress that the strut material can withstand is less than the stress that it will experience. Using an example value of a planar region of diameter D=5 mm and a relative strain $\epsilon_R$ of 1%, one can see that the shear displacement at the perimeter of the circular region is 25 microns. This would be sufficient to break square cross-section perimeter struts 308 as specified above. Thus, even a small feature of the casting, i.e. on the order of 5 mm, has enough shear displacement to cause breakage of the struts in bending.

The calculations above show that a mold system can be designed that will fail for a wide range of mold geometries and geometric features, including small casting features. The methodology therefore can be quite insensitive to the precise nature of the cast part geometry. Further, it is not required that each and every support strut 308 break. If a substantial fraction along a path to relieve stresses on the mold break, the traction on the surface of the casting 302 will be relieved.

For an extremely small feature, for typical ceramics e.g. in the range of 5 mm or smaller, the skeletal elements may simply bend elastically, but not fail. This bending will minimize any stress that might be placed on the casting, and avoid failure or distortion of the casting. Thus, the mold will serve its objective of preventing damage or distortion to the casting, even if it does not fail in the region of such small features.

Thus, the designer will choose b and w such that the ratio of b/w exceeds the quantity determined by Eq. 6, above, to ensure that the mold will not fail during pouring. Simultaneously, the designer will choose h and L using Eqs. 9A, 10 and 11A to ensure that the mold fails during cooling by making sure that the strut experiences a stress that exceeds its maximum sustainable stress.

Fabricating a Cast Part

Figure 6:
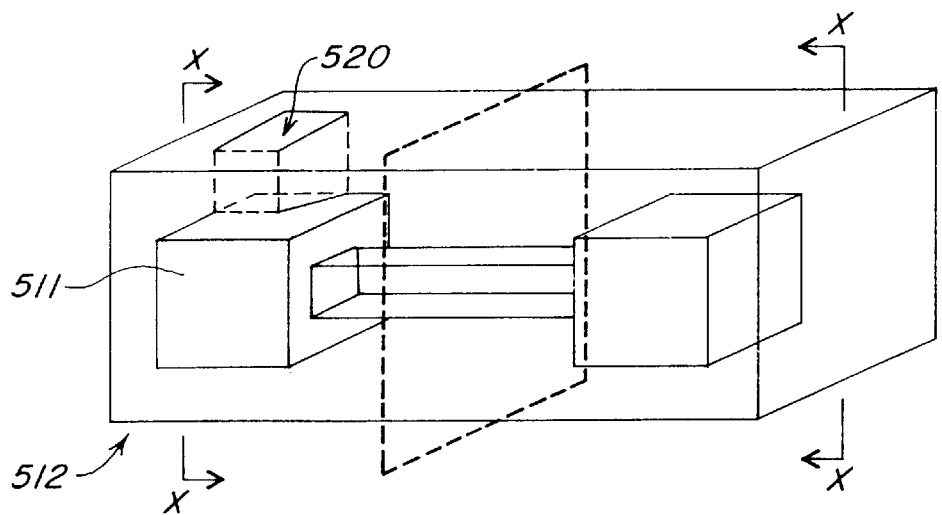
FIG. 6 is a schematic view of a mold of an embodiment of the invention, for fabricating a rectangular cross-section dumbbell-shaped casting.

Turning now to a discussion of fabricating a cast part according to one embodiment of the invention, FIG. 6 shows a mold 512, schematically. The rectangular cross-sectional dumbbell region 511, shown schematically inside the mold, is initially hollow. Eventually, the casting will form inside of it. An opening 520 in the top surface of the mold 512 communicates with the internal cavity 511. Molten casting material will be introduced to the cavity 511 through the opening 520.

Figure 7:
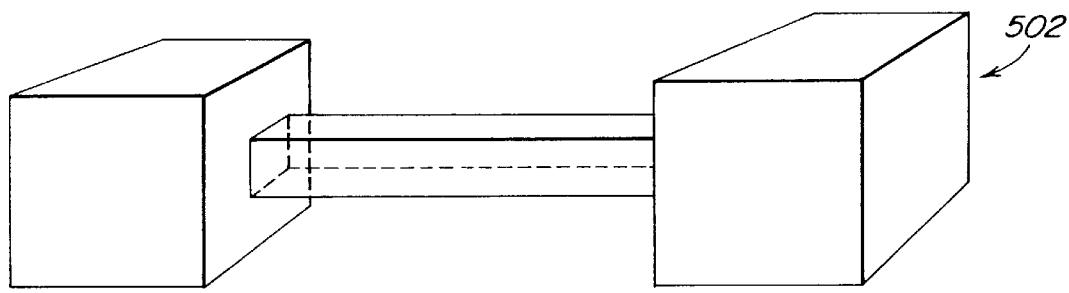
FIG. 7 is a schematic view of a casting made by the mold shown in FIG. 6.

FIG. 7 shows the part 502 that will be produced in the mold 512. It is a dumbbell, or dog-bone, with generally rectangular cross-sections. Such a part would have a high likelihood for hot tears, if cast with known technology. It lacks adequate fillets at corners; it has abrupt variations in thicknesses, and the bulbous ends would anchor the casting to the ceramic mold and prevent the metal part from contracting, as it would tend to do.

Figure 8:
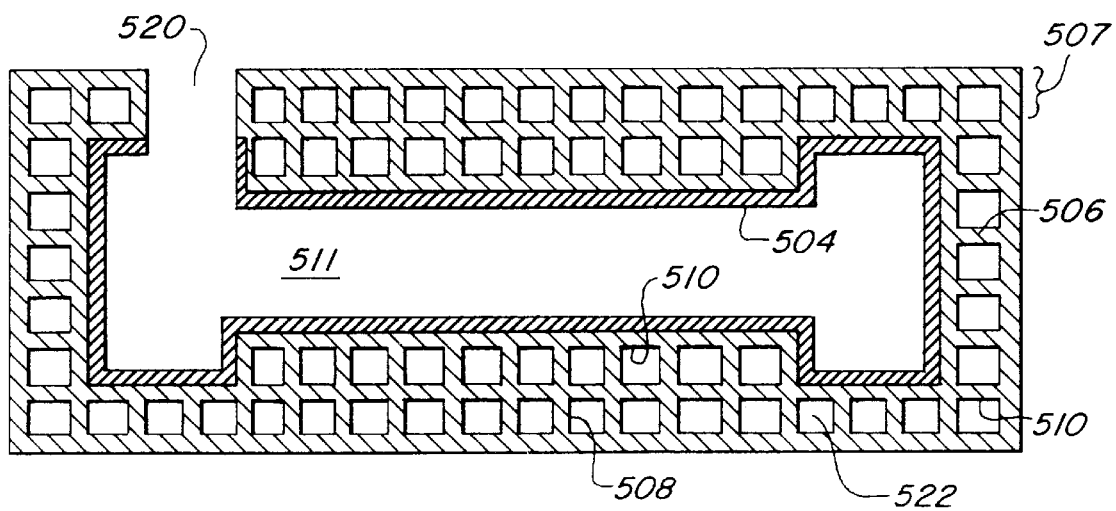
FIG. 8 is a schematic cross-sectional view of the mold of FIG. 6 cut along the lines X—X.
Figure 10:
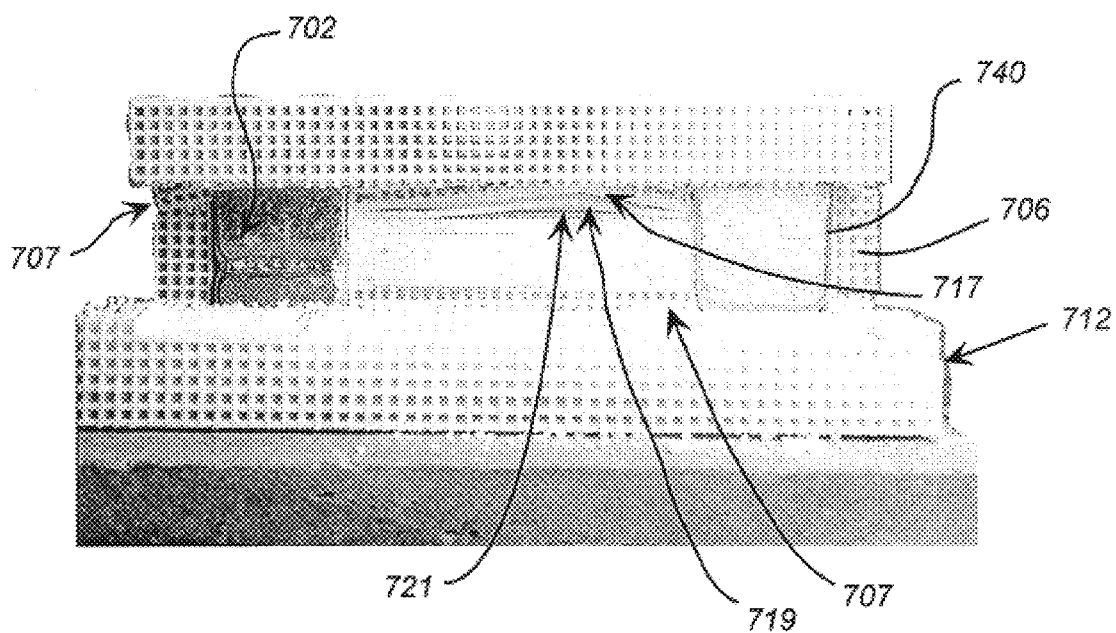
FIG. 10 is a digital image of a schematic view of a fractured mold of the embodiment of the invention shown in FIG. 6, after rupture, revealing the cast rectangular dumbbell-shaped part inside.

The mold 512 is shown schematically in cross-section in FIG. 8, which is a cross-section of the mold of FIG. 6 along lines X—X. The cavity 511 is substantially surrounded by a thin shell 504, such as is described above at 204, in connection with FIG. 2. It is designed to fail under compression that arises due to the shrinkage of the casting upon solidification, and to the differential in contraction during cooling of the casting and the shell 504. The shell itself, is, in turn, surrounded by a support structure 506, which is shown schematically to be made up of struts 508 that, in part, define cells 522. The cells 522 are also defined, in part, by courses 510. A set of cells makes up a story 507. In some regions, such as adjacent the slender, inner part of the dumb-bell cavity, two stories 507 are provided, while in other regions, such as adjacent the ends, only one is provided. (FIG. 8 is schematic only. FIG. 10 shows a digital image of an actual casting and mold which has approximately seven stories adjacent the center and five adjacent the ends.)

As discussed above, in connection with FIG. 2, the courses 510 may be strut-like lattice elements, resulting in a fully open lattice type cell structure, as shown on the left hand side L of FIG. 2.

Figure 4:
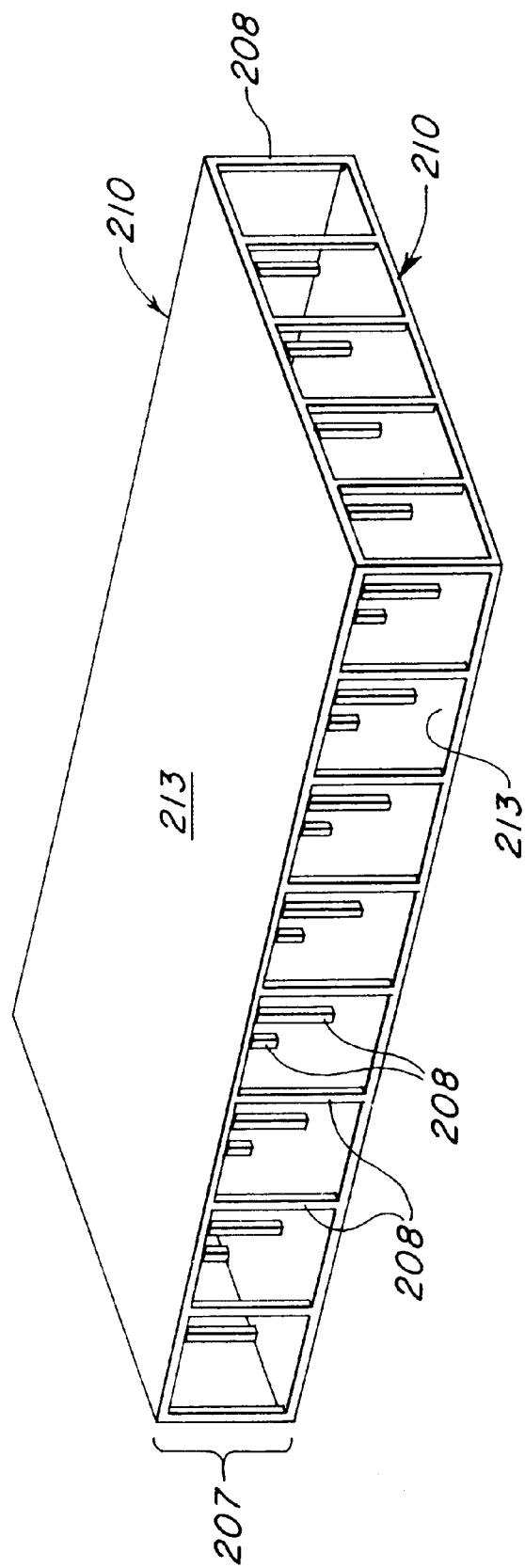
FIG. 4 is a schematic representation of a sheet based cellular primitive according to another embodiment of the invention, of which the support structure may be built, in whole or in part.

Alternatively, as shown in FIG. 4, the spaced courses 210 may be continuous sheets 213, or a combination of sheets 213 and lattice elements 810, as shown in FIG. 2. FIG. 4 shows one story 207, with a sheet form course 213 on the bottom, and struts 208. Another course 210, of the next story is shown on top. However, it should be kept in mind that each story 207 includes only one course.

It will be understood that to some extent, in some configurations it may be arbitrary to distinguish between struts and courses. For instance, in the case of an open lattice structure, as shown on the left hand side L of FIG. 2, and a symmetric casting, such as shown in FIG. 10, the struts and courses are essentially the same, with the only distinguishing feature being the location of the pouring hole.

In FIGS. 2 and 4, the sheets 213 are oriented generally horizontally, as shown. This should not be considered to be limiting in any sense. In any particular mold structure, the sheets may be oriented along any dimension (horizontally, vertically, in between, etc.) as the mold is used. Further, sheets in one portion of the mold may be oriented perpendicularly, or at any other angle, to sheets in a different portion of the mold.

FIG. 2 shows straight, generally rectilinearly arranged struts 208 and lattice elements 810 with the lattice elements 810 making up the courses, and flat, rectangularly bounded sheets 213 as the courses. However, these structures need not be rectilinear. In the proper structure, the struts can be curved and inclined relative to each other. Further they can have any-cross section, and the cross-section may vary along their length.

Similarly, the sheets 213 need not be planar, but can also be curvaceous, as the needs of molding may require. They can also have varying thickness at different locations. One of the strengths of the various solid free form fabrication techniques in general, and Three Dimensional Printing, in particular, is that they can fabricate components of a wide variety, of almost any, shapes. Thus, the support structure surrounding the mold to make such parts must, and may also accommodate these shapes.

FIG. 10 shows the struts and courses to be located in a regular pattern, with equally spaced struts and courses. However, the struts and courses may be spaced unequally, or irregularly, as is required, to ensure that the mold fails before the casting is damaged.

Non Planar Casting Surfaces

Up to this point, the methods for insuring that the castings do not tear or deform during solidification and cooling have been illustrated with surfaces that are planar, for clarity of presentation. The concepts, however, apply more generally to a casting of any shape, including any shape external surface and any shape internal geometry.

Figure 12:
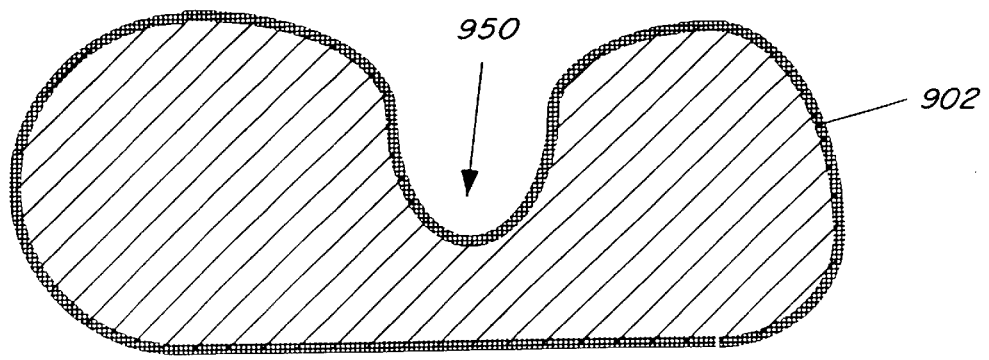
FIG. 12 is a schematic representation in cross-sectional view of a portion of a casting made according to an embodiment of the invention having non-planar surfaces, and a concavity.
Figure 13:
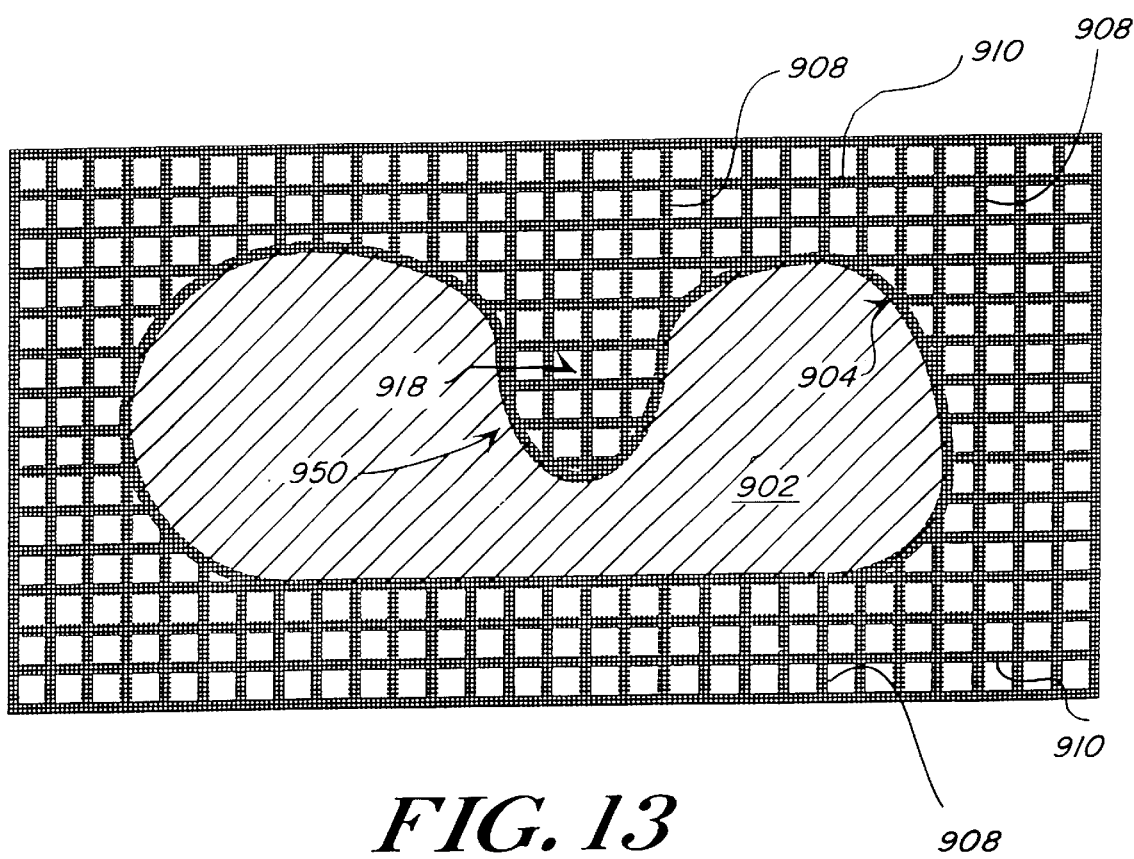
FIG. 13 is a schematic representation in cross-sectional view of a portion of a mold, including a relatively rectilinearly arranged support structure, for fabricating a casting as shown in FIG. 12.

FIG. 12 shows, in 2-D cross-section (elevation view), a casting 902 with a non-planar, curved external geometry, which includes a concavity 950. The mold would again include a thin shell, which surrounds the part, as shown in FIG. 12. The support structure behind the shell might again consist of struts. However, in this case, the struts must in some manner accommodate the changes in angle of the surface. FIG. 13 shows a rectilinear truss system accommodating the part geometry of FIG. 12. In this case, the struts 908 and courses 910 will, in general, not intersect the bounding shell 904 perpendicularly. The shrinkage of the casting 902 and its effect on the struts 908 and courses 910 will be a bit different than in the case of a planar surface where the struts and courses intersect the shell perpendicularly. (It is useful, at this point, to note, that for many purposes, including this one, the distinction between struts and courses is somewhat arbitrary.) In the case of non-perpendicular intersection, the shear displacement of the strut or course at its intersection with the shell will lead both to bending stresses and to compressive loads. Thus, the failure of such struts or courses will be due to a combination of these loading patterns. The methods described herein can be used to guarantee that either failure mode would be sufficient to guarantee failure of the strut or course. The advantage of this technique is that the design of the shell support system can be relatively easily automated.

Alternatively as shown in FIG. 14, the struts 1008 can be arranged substantially perpendicular to the shell 904. The courses, 1010, are essentially parallel, or concentrically congruent with the shell. In such a case, the irregular geometry of the casting must be accommodated by some irregular arrangement (ie., a non-uniform pattern) of the struts, as illustrated in FIG. 14. In such a case, the failure of the struts will be primarily due to stresses induced by bending. (Note that in both FIGS. 13 and 14, the plane of the cross-section does not cut through any portion of the pouring hole for introducing molding material to the cavity. Thus it is not shown.)

Basic Use of the Mold

In general, when a layered manufacturing technique that uses powder is used, such as Three Dimensional Printing, as described in the patents identified above, the support structure 506 (FIG. 8) must be open to a degree that will permit the removal of the unbound powder. Typically, then, it is beneficial that there be a continuous open path from every cell to the outside of the support structure, to facilitate the removal of the loose powder. If liquid is used, such as stereo lithography would use, with ceramic powder, then paths for the removal of uncured liquid must be provided.

Figure 9:
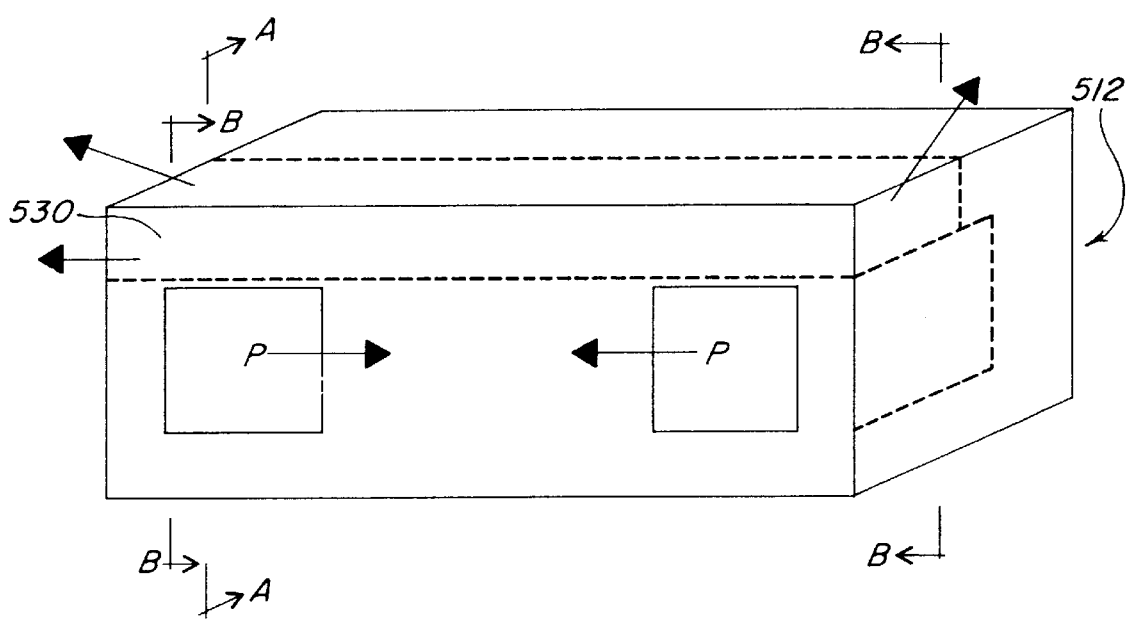
FIG. 9 is a schematic view of the mold shown in FIG. 6, with likely patterns of mold fracture under stresses of solidification and cooling.

FIG. 9 shows schematically a possible scenario for the reaction of the mold 512 to the stresses that arise upon solidification and cooling. In general, large stresses may arise along the directions indicated by the arrows P. These will give rise to shear stresses, which might cause a section, such as 530, to separate from the remainder of the mold. FIG. 9 shows with dotted lines where fracture lines in the support structure arise, generally around the part. The fractures arise as the part shrinks away from the support structure, pulling with it, in some places, portions of the shell 504, which adhere thereto, and, in other places, crushing the support structure that resides between the enlarged end portions of the dog-bone shape.

FIG. 10 shows schematically, by a digital image, a mold 712, that was used to make a part 702. A portion of the mold 712 has been removed. In fact, when a part was actually made, using a mold as shown in FIG. 10, the stresses caused the mold to rupture somewhat violently, forcing large pieces of the mold to fly away from the casting. In this example, the cellular structure was of the open lattice type shown in FIG. 2 on the left hand side L. It can be seen that some of the stories 707 bowed upward, as shown in FIG. 10, and buckled, as they were squeezed and dragged under influence of the contracting dumb-bell shape. It can also be seen that at the end 740 of the casting, the casting separated from the support structure 706 that was adjacent to it. The thin shell is visible 717 above the thinner, bar section of the dumb-bell, having buckled upward. Another thin strip 719 of ceramic is also shown. This is a thin, spaghetti-shaped strip that had formed a piece of the shell in front of the casting, the top edge 721, of which, is just barely visible.

Design of Support Structure for Failure by Compression.

Figure 5:
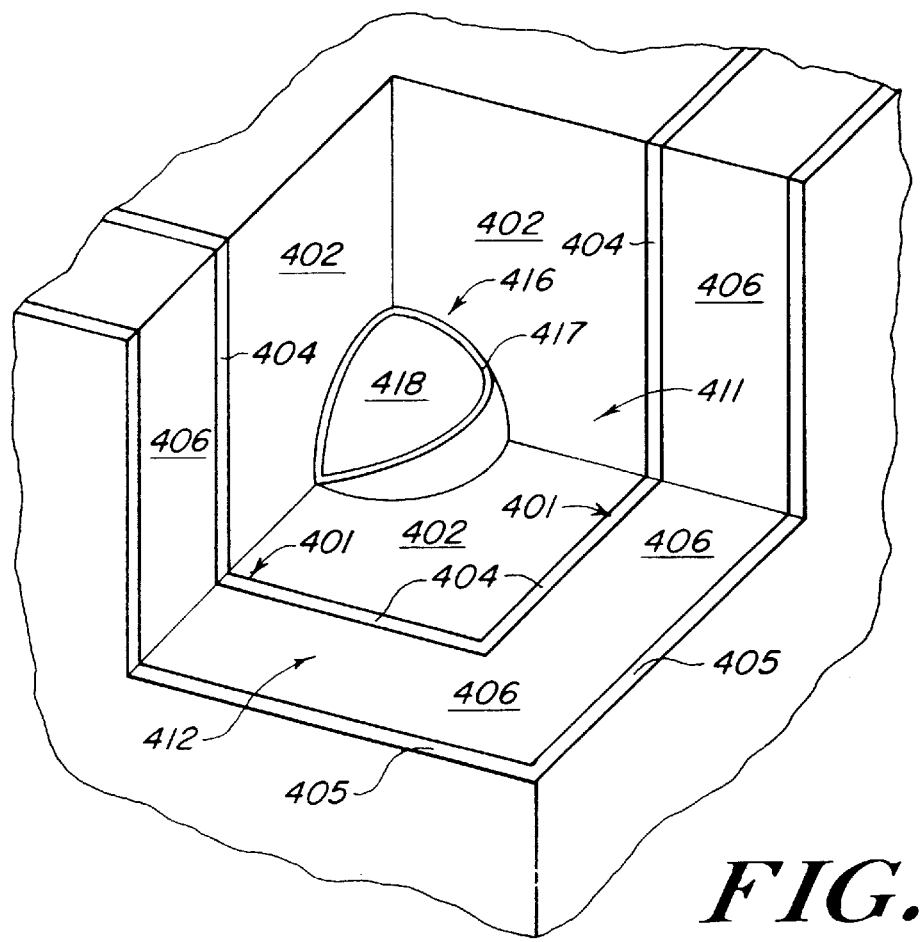
FIG. 5 is a schematic representation with some parts removed in perspective view of an embodiment of the mold of the invention having an internal core that is spherical.

The foregoing discussion has described molds and processes for making rather simple parts. A more complex part, such as a hollow casting, requires that the ceramic mold have a ceramic core to define the hollow space. Similarly, a casting with a concavity requires a core-like portion of the support structure. For instance, FIG. 5 shows schematically a mold for making a casting 402 with a spherical internal hollow. The mold has an outer portion 412, and an inner core 416. The outer portion has a thin shell 404 with an inner surface 401 and a support structure 406, both, as described above. A hollow casting will form in the annular region 402. Such a casting will have a hollow, spherical center. As a hollow casting cools, in general, the shrinking casting tends to put the ceramic core 416 in a combination of shear and compression. The relative contribution of shear and compression will depend on the geometry of the hollow space 411 and the core 416. For the example of an internal spherical space, as shown, the stresses will primarily load the core in compression and the struts will need to fail by crushing. In contrast, an internal space that is in the shape of a rectangular volume will create loading that is a combination of shear and compression. Depending on the relative contributions of shear and compression, the struts will either fail in bending or by crushing.

Similarly, referring to FIGS. 13 and 14, the portion 918 (FIG. 13) and 1018 (FIG. 14) of the mold that is partially bounded by the casting 902 will be subjected to loading that is a combination of shear and compression. For cores that are configured such that a significant portion of the struts are placed under compression, rather than shear, it is important to design the ceramic support structure to fail due to compressive loading, as this may be the dominant loading mode. This may be accomplished by designing the support structure, such as struts or columns, to break either in compression or in a buckling mode or both. As noted above, in ranges of practical values of strut width and length, failure in compression will generally be encountered at stresses lower than those required to cause failure in buckling. Thus, in most cases, struts under compression will fail in pure compression, rather than buckling.

As noted above, the support structure struts can be and are designed so that they will not fail during pouring, even when their compressive strength is at the lower end of the expected range. Ensuring that the support struts withstand pouring defines a minimum value of the ratio b/w, generally, because the struts become weaker with smaller b, and there is more pressure per strut with larger w.

Given a maximum value of stress that the casting can tolerate during cooling (without suffering from a hot tear), one can also define a maximum value of the ratio b/w, to limit the stress imposed on the casting during the cooling. This ratio $$\frac{b}{w}\bigg|_{max}$$

can be obtained by balancing the force necessary to break a strut (Maximum Compressive Strength*$b^2$) with the force exerted on the surface of the casting over the area between struts (Maximum allowed stress on casting*$w^2$) and rearranging:

$$\frac{b}{w}\bigg|_{max} = \left(\frac{\text{Maximum allowed stress on Casting}}{\text{Maximum Compressive Strength}}\right)^{1/2} \quad (12)$$

The denominator is the highest value of compressive strength likely to be sustained by the ceramic, in order to guarantee that even such a column will fail before excessive stress is applied to the casting.

Eq. 12, above is a guideline for design. In practice, the designer would calculate $$\frac{b}{w}\bigg|_{min}$$

from Eq. 6, and multiply that by a safety factor, and make and use the mold. If the mold proves too fragile, then the designer will increase b/w, by either increasing b or decreasing w, or both. If, on the other hand a hot tear or other casting deformation arises, then b/w should be decreased, by either decreasing b, or increasing w. Both sorts of adjustments can be done, either locally, near to the mold or casting failure, or overall, depending on the casting size, complexity, cost of mold fabrication, etc.

For example, if the maximum allowed stress on the casting is 10 MPa and the maximum compressive strength of the ceramic is 125 MPa, then the ratio b/w must not exceed 0.28. In the example cited above, in connection with Eq. 6, it was found that the minimum allowed value of the ratio b/w is 0.05. The actual ratio must therefore lie between 0.05 and 0.28. For a spacing w between struts of 15 mm (which is reasonable), the cross section dimension of the struts (b) must lie between 0.75 and 4.2 mm. This will guarantee that the core struts do not fail in compression or buckling during pouring, but do fail in compression before a surrounding casting can be damaged due to compressive loads imposed by the core (or shell) during cooling. In general, the maximum allowed ratio of b/w will be determined by experience.

The foregoing analysis indicates that for a wide variety of useful metal casting materials, and mold materials, a mold can be designed to fail before damage to the casting arises. Further, even for very small features, e.g. on the order of five mm, there is a large safety factor, making it possible to eliminate damage to the casting, virtually for certain. It should be noted that the skeletal elements can be different sizes and shapes as is required, in different regions of the mold. For instance, adjacent very small features, the skeletal elements can be thinner, for instance, thin struts.

Voids

In some cases, it may be beneficial to provide some filler for the voids, but which filler will burn, or melt, or otherwise deteriorate away after the hot molding material is provided. For instance, certain fillers for the void may enhance the durability, or handleability of the mold. For instance, a foam filler may provide shock resistance to sharp, accidental impacts that the mold may experience in handling. Such spaces are still considered to be "voids", as that word is used in the appended claims, whether or not the non-structural filler material completely deteriorates as the mold is filled with casting material.

Support Structure Outer Shell

In many instances, it is beneficial to provide an outer shell to surround, in whole, or in part, the support structure. As shown schematically in FIG. 5, a thin, outer shell 405 surrounds the support structure 406 of the outer portion 412. The thin intermediate shell 404 defines the outer surface of the casting 402. The inner surface of the casting 402 is defined by the thin, innermost shell 417, which itself surrounds a core support structure 418. The outermost shell 405 is useful to facilitate handling and supporting the support structure either before it is fully processed (such as while it is still a green part) or even after full processing, in the many cases where an open lattice structure will be too fragile for handling. The outermost shell may be substantially complete, surrounding or enveloping the entire support structure, or it may be partial, existing at specific spots. Of course, there must be enough openings to remove unbound powder, or other mold material, such as liquid, in stereolithography.

Tub-like Mold

The foregoing has illustrated embodiments of the invention with molds that generally enclose the casting in all directions, other than the port for filling casting material. However, the invention is also useful in connection with simpler, tub-like molds, that are generally open on one surface. For instance FIG. 11 shows such a tub-like version of a mold for casting a partial dumb-bell-shaped casting 802, that has a flat surface 820 perpendicular to the positive z direction. A thin shell 804 defines the cavity, and is open in the positive z direction. Further, the shell 804 does not enclose the casting in the positive z direction. It is surrounded by a foraminous support structure 806, as described above, made up of skeletal elements and voids therebetween. The support structure 806 surrounds the thin shell 804 and the casting 802 in the positive and negative x and y directions, and the negative z direction, but not in the positive z direction. Thus, such a mold can be used for objects that have a complex geometry, accompanied by a planar surface, for instance, a flat base.

Stress or Strain

The foregoing discussion has focussed on the stress that is applied to the various portions of the mold (shells and support structure) and their strengths in resistance to such stresses. Thus, it has generally been stated that the inner shell(s) that define the casting shape, must have enough strength to withstand the stresses of mold filling, but must not be so strong as to resist failure as the casting cools. The support structure has been characterized in the same way.

It is equally informative and correct to consider the phenomena at hand in terms of the failure strains of the materials involved, and the displacements of the structures. Thus, the shell and support structure must tolerate without failure the displacements that result from the hydrostatic loading of the molten metal during filling. Conversely, the shell and support structure must fail at displacements that are lower than those which the casting experiences as it solidifies and cools.

Heat Loss from Casting

An important aspect of creating a sound casting (that is, a casting with no voids) is proper control of the solidification of the casting. In some cases, it is necessary to be able to impose a directional solidification on the casting, to control the grain size and grain orientation. Such is the practice, for example, in casting turbine blades, either directionally solidified with columnar grain structure, or single crystal.

The shell and support structure of the present invention can be applied in controlling the heat transfer from the casting. In regions where it is desirable to lose heat rapidly, the support structure can be left relatively open, to provide for pathways for radiative and convective heat transfer. The thin inner support shell also promotes rapid loss of heat.

In regions where it is desirable to reduce the heat flux from the casting, to slow the cooling, the support structure may be modified to provide a highly insulating structure. For example, rather than providing an open lattice strut system, such as that shown in FIG. 2 on the left hand side L, the provided strut system may have planes of ceramic material, such as that shown in FIG. 2 on the right hand side R, and FIG. 4. These planes will act both as radiation shields and also to reduce convective heat transfer, thereby providing a highly insulating structure to accommodate differential dimensional changes. Some regions can be open lattice, while other regions of the same mold can be in the planar form.

As has been mentioned, it is also possible to fill the voids, either fully or partially, with a weak material, such as ceramic fiber, which will not prevent the support structure from failing. Such filling material can be placed at selected locations in the mold. It can act as additional thermal control, reducing both radiation and convection heat transfer, where desired.

Thus, the support structure may be locally tailored to provide the desired heat flow from the casting during cooling while simultaneously providing a disintegrating structure that protects the casting.

Mold Fabrication Steps

The general nature of SFF techniques has been described above, and the more specific, yet still general nature of Three Dimensional Printing is set forth in the patents and applications listed at the beginning of this Detailed Description. Those principles may be applied to fabricate a mold of the present invention. Taking Three Dimensional Printing as illustrative, a computer representation of the three dimensional description of the mold, including inner shell(s), support structures, outer shell, voids, struts, courses, etc. is generated. From this, the part is built up by providing layers of powder, and sweeping across each layer with binder (according to any of the many methods mentioned in the patents listed), such that the struts and shells of the mold will bind. After the entire part has been built up, it is processed, to bond the bound parts. Then powder is removed. It may also be further processed.

It is important for most embodiments of the invention that use powder particles to build up the support structure, to allow passageways from the areas that will eventually be voids, to outside of the support body. These passageways are necessary to allow the removal of the powder particles that will not be bound, so that the voids can be emptied and thereby form. In some cases, if the powder is not too tightly packed, unbound powder can be left in the voids, as it will not prevent collapse of the mold upon cooling.

The orientation of the build up of layers may be any orientation. For instance, if the mold is generally rectilinear, with parallel stories of cells, then it may be built up such that the layers of powder provided are provided parallel to the planes of the stories. Alternatively, the entire part may be built up with the layers of powder provided obliquely relative to the planes of the stories. It does not matter that they are not parallel, because the binder can be applied to bind together powder particles that lie in a plane that is oblique to the plane of the layer of provided powder. The unbound powder supports the structure before the structure is removed from it.

The mold is typically further processed to enhance its handleability, such as by heating, sintering, or even infiltration, as described in the patents and applications listed above.

Use of the mold has been described above, in general. The support structure and casting shell is supported on a fixture. Molten molding material is poured into the cavity such as through one or more access holes. The molten material is maintained such that it solidifies, with the possibility that the order and rate of solidification occurs in a controlled manner due to the customized arrangement of struts, sheets, cells and stories. The casting cools further, contracting as it does so, eventually resulting in the failure of the thin shells and support structure, in enough places such that even small features of the casting avoid hot tears or deformations.

The invention can also be implemented with the other SFF techniques mentioned above, and the disclosure and the claims should not be considered to be limited to the powder or Three-Dimensional Printing embodiments discussed in detail or the stereolithography embodiments also discussed.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

The corresponding structures, materials, acts and equivalents of all means or step plus function elements in the claims below are intended to include any structure, material, or acts for performing the functions in combination with other claimed elements as specifically claimed.

Having described the invention, what is claimed is:

1. A mold for casting a part made from a molding material, which material experiences dimensional change during a mold process, said mold comprising:

a. a thin inner shell, which:
   i. defines a three dimensional cavity that will establish locations of features of the casting part;
   ii. is impervious to flow of liquid molding material therethrough;
   iii. is configured to not fail under any stresses arising within said inner shell due to pouring of said liquid molding material into said cavity; and
   iv. is configured to fail under stresses arising within said inner shell as any such molding material solidifies or cools; and
b. a three-dimensional support body that supports said inner shell, which support body is defined by an internal structure of supporting skeletal elements in predetermined locations and orientations relative to features of the casting part, and voids between said skeletal elements, and which:
   i. is configured to not fail under any stresses arising within said support body due to pouring of said liquid molding material into said cavity; and
   ii. is configured through the locations and orientations of the skeletal elements within its internal structures to fail at predetermined regions relative to the locations of features of the casting part, under stresses arising within said support body as any such molding material solidifies and cools.

2. The mold of claim 1, said stresses within said support body that arise during a molding process being due to at least one phenomena of the group consisting of:
   any dimensional change of any molding material residing in said cavity upon solidification; and
   a difference between the coefficients of thermal expansion of said support body on the one hand and any such molding material on the other hand.

3. The mold of claim 1, said stresses within said thin inner shell that arise during a molding process being due to at least one phenomena of the group consisting of:
   any dimensional change of any molding material residing in said cavity upon solidification; and
   a difference between the coefficients of thermal expansion of said thin inner shell on the one hand and any such molding material on the other hand.

4. The mold of claim 1, said support body being contiguous with said inner shell.

5. The mold of claim 1, said skeletal elements arranged such that during any dimensional changes of said molding material, enough of said skeletal elements would fail to prevent distortions to said part being cast.

6. The mold of claim 5, some of said skeletal elements arranged to fail in bending.

7. The mold of claim 5, some of said skeletal elements arranged to fail in compression.

8. The mold of claim 5, some of said skeletal elements arranged to fail in buckling.

9. The mold of claim 1, said support body comprising a cellular body.

10. The mold of claim 9, said cellular body comprising rectilinear cells.

11. The mold of claim 9, said cellular body having a continuous open path from within each cell to outside said body.

12. The mold of claim 9, said cells having substantially equal volume.

13. The mold of claim 9, said cells having different volumes.

14. The mold of claim 1, said support body comprising bound ceramic powder particles.

15. The mold of claim 1, said skeletal elements comprising bound ceramic powder particles.

16. The mold of claim 14, said molding material comprising metal.

17. The mold of claim 15, said voids having a linear dimension that exceeds three times the average linear dimension of said powder particles.

18. The mold of claim 1, said support body comprising photocurable polymer loaded with ceramic particles.

19. The mold of claim 1, said skeletal elements and voids arranged in at least one story, which story comprises a course connected to struts, which are connected to said thin inner shell.

20. The mold of claim 19, the support structure further comprising a plurality of stories, each of which comprises a course, connected to struts, which are connected to an adjacent story.

21. The mold of claim 1, said skeletal elements comprising struts, arranged to form a cellular network.

22. The mold of claim 21, wherein in a specified region, the struts have a cross-sectional area of $b^2$, and are spaced from adjacent struts a distance w, further where the struts are sized and spaced such that the ratio b/w is greater than the square root of the ratio of the hydrostatic pouring pressure of the molding material, over the minimum compressive strength of the material from which the struts are made.

23. The mold of claim 21, wherein, in a specified region of said support structure, the struts have a cross-sectional area of $b^2$ and further, wherein, adjacent said specified region, the casting has a feature, having a linear dimension D, and each strut has a length L, a neutral axis located a distance h from a surface of the strut which is under maximum tensile load, and is made from a material having an elastic modulus E, and the relative strain between said casting and said thin shell is $\epsilon_R$, the struts being sized and shaped further such that the maximum tensile breaking strength of the struts is less than $$\frac{6Eh}{L^2} * \frac{\epsilon_R D}{2}.$$

24. The mold of claim 23, said struts comprising square struts, and said maximum tensile breaking strength of the struts being less than $$\frac{3Eb}{L^2} * \frac{\epsilon_R D}{2}.$$

25. The mold of claim 1, said skeletal elements comprising sheets.

26. The mold of claim 1, said support body comprising at least one story of skeletal elements.

27. The mold of claim 1, said mold further comprising an outer shell that contacts an outermost story.

28. The method of claim 27, said outer shell substantially enveloping said support body.

29. The mold of claim 28, said outer shell having an opening therethrough, which communicates through an open path to said cavity, for the delivery of molding material through the outer shell and support body to said cavity.

30. The mold of claim 1, said inner shell having an open boundary with which said support body is not contiguous, thereby forming a tub-like mold.

31. A mold comprising:
   a. a thin inner shell that defines a three dimensional cavity that will establish locations of features of the casting part; and b. a three-dimensional foraminous support body that is contiguous with and substantially surrounds said inner shell, said support body being constructed of skeletal elements with voids therebetween, the voids comprising a network having an open pathway from each void to outside said support body and said skeletal elements being positioned and oriented according to a designed morphology at predetermined regions relative to the locations of features of the casting part.

32. The mold of claim 31, said skeletal elements comprising ceramic.

33. The mold of claim 31, said body comprising cells.

34. The mold of claim 33, said body having a continuous open path from within each cell to outside said body.

35. The mold of claim 31, said body comprising rectilinear cells.

36. The mold of claim 31, said skeletal elements comprising bound powder.

37. The mold of claim 36, said powder comprising ceramic powder.

38. The mold of claim 36, said open pathways having a cross-sectional dimension large enough to permit passage of said powder therethrough, such that unbound powder can be removed from the voids.

39. The mold of claim 31, said support body comprising photocurable polymer loaded with ceramic particles.

40. The mold of claim 39, said ceramic particles comprising fibers.

41. The mold of claim 31 said skeletal elements comprising struts, arranged in a cellular network.

42. The mold of claim 41, said skeletal elements further comprising sheets, connected by said struts.

43. The mold of claim 41, wherein, in a specified region of the support structure, adjacent a feature of the casting that has a dimension D, each strut has a length L, a cross-sectional area of $b^2$, a neutral axis located a distance h from a surface of the strut which is under maximum tensile stress, and is made from a material having an elastic modulus E, and is spaced from adjacent struts a distance w, and wherein the relative strain between said casting material and said thin shell material is $\epsilon_R$, the struts being sized and spaced further such that the maximum tensile breaking strength of the struts is less than $$\frac{6Eh}{L^2} * \frac{\epsilon_R D}{2}.$$

44. The mold of claim 43, said struts comprising square struts, and said maximum tensile breaking strength of the struts being less than $$\frac{3Eb}{L^2} * \frac{\epsilon_R D}{2}.$$

45. The mold of claim 43, the struts in said region further being sized and spaced such that the square of the ratio b/w is greater than the ratio of the hydrostatic pouring pressure of the molding material over the minimum compressive strength of the material from which the struts are made.

46. The mold of claim 41, said struts having a cross-section that varies along their length.

47. The mold of claim 41, said struts comprising curved struts.

48. The mold of claim 31, said support body comprising at least one story of skeletal elements.

49. The mold of claim 48, further comprising an outer shell that contacts an outermost story.

50. The mold of claim 49, said outer shell having an opening therethrough, which communicates through an open path to said cavity, for the delivery of molding material through the outer shell and support body to said cavity.

51. The mold of claim 31, said support body substantially surrounding said inner shell.

52. The mold of claim 31, said support body substantially surrounding said inner shell on all but one side, forming a tub-like mold.

53. The mold of claim 31, said skeletal elements and voids further arranged to provide a predetermined pattern of heat transfer from any casting material as it cools to form a part to be made with said mold, which heat transfer varies at different locations in said pattern.

54. A method of making a mold, said method using a solid free form layered fabrication technique, comprising the steps of:
  a. providing a machine readable model of a mold geometry comprising:
    i. a thin inner shell, which:
      A. defines a three dimensional cavity;
      B. is impervious to flow of liquid molding material therethrough;
      C. is configured to not fail under any stresses arising within said inner shell due to pouring of said liquid molding material into said cavity; and
      D. is configured to fail under stresses arising within said inner shell as any such molding material solidifies or cools; and
    ii. a three-dimensional support body that supports said inner shell, which support body:
      A. is configured to not fail under any stresses arising within said support body due to pouring of said liquid molding material into said cavity; and
      B. is configured to fail under stresses arising within said support body as any such molding material solidifies and cools; and
  b. using said model to drive a solid free form layered fabrication machine, building up, by layers, a mold that is defined by said geometry.

55. The method of claim 54, said step of building up, by layers, comprising the steps of:
  a. depositing a layer of a powder material in a confined region;
  b. applying a further material to one or more selected regions of said layer of powder material which will cause said layer of powder material to become bonded at said one or more selected regions that will become said inner shell and a plurality of skeletal elements of said support body;
  c. repeating steps (a) and (b) a selected number of times to produce a selected number of successive layers, said further material causing said successive layers to become bonded to each other to form said inner shell and said skeletal elements of said support body; and
  d. removing unbonded powder material which is not at said one or more selected regions, to form said cavity and voids between said skeletal elements.

56. The method of claim 55, said model of said mold comprising a rectilinear cellular body being defined by substantially parallel planar stories, wherein said repeated step of depositing a layer of powder material comprises depositing a layer in a plane that is substantially parallel to said substantially parallel stories.

57. The method of claim 55, said model of said mold comprising a rectilinear cellular body being defined by substantially parallel planar stories, wherein said repeated step of depositing a layer of powder material comprises depositing a layer in a plane that is oblique to said substantially parallel stories.

58. The method of claim 54, said step of providing a model of a three dimensional support body further comprising the step of providing a model of skeletal elements with voids therebetween, arranged to provide a predetermined pattern of heat transfer from any casting material as it cools to form a part to be made with said mold, which heat transfer varies at different locations in said pattern.

59. A method of making a mold, said method using a solid free form layered fabrication technique, comprising the steps of:
   a. providing a machine readable model of a mold geometry comprising:
      i. a thin inner shell that defines a three dimensional cavity that will establish locations of features of the casting part; and
      ii. a three-dimensional support body that is contiguous with and substantially surrounds said inner shell, said support body being constructed of skeletal elements with voids therebetween, the voids comprising a network having an open pathway from each void to outside said support body and said skeletal elements being positioned and oriented according to a designed morphology at predetermined regions relative to the locations of features of the casting part; and
   b. using said model to drive a solid free form layered fabrication machine, building up, by layers of material, a mold that is defined by said geometry.

60. The method of making a mold of claim 59, said free form layered fabrication technique being selected from the group consisting of:
   Three Dimensional Printing, Selective Laser Sintering, Stereo Lithography, CAM-LEM, Fused Deposition Modeling and Ballistic Particle Manufacturing.

61. The method of claim 59, said step of providing a model further comprising, in a specified region of the model of the support structure, adjacent where a feature of the casting has a linear dimension D, providing model skeletal elements that comprise struts, each strut having a length L, a cross-sectional area of $b^2$, a neutral axis located a distance h from a surface of the strut which is under maximum tensile stress, and being made from a material having an elastic modulus E, and the struts being spaced from adjacent struts a distance w, wherein the relative strain between said casting and said thin shell is $\epsilon_R$, further wherein in the model, the struts are sized and spaced such that the maximum tensile breaking strength of the struts is less than $$\frac{6Eh}{L^2} * \frac{\epsilon_R D}{2}.$$

62. The method of claim 61, wherein said step of providing a model comprises the step of providing a model with struts having a square cross-section, wherein the struts are sized and shaped such that the maximum tensile breaking strength of the struts is less than $$\frac{3Eb}{L^2} * \frac{\epsilon_R D}{2}.$$

63. The method of claim 61, said step of providing a model further comprising, in said region, sizing and spacing said struts such that the square of the ratio b/w is greater than the ratio of the hydrostatic pouring pressure of any molding material over the minimum compressive strength of the material from which the struts are made.

64. The method of making a mold of claim 59 said model of said mold further comprising a cellular body.

65. The method of making a mold of claim 64, said model of said mold further comprising a rectilinear cellular body.

66. The method of claim 59, said solid free form layered fabrication technique comprising a technique that provides layers of bound powder.

67. The method of claim 59, said solid free form layered fabrication technique comprising a technique that provides layers of photocurable polymer.

68. The method of claim 59, said body of said model comprising an open network having an open pathway from each void to outside said support body.

69. The method of claim 59, said skeletal elements of said model comprising struts, arranged to form a cellular network.

70. The method of claim 69, said skeletal elements of said model of said mold further comprising sheets, connected by said struts.

71. The method of claim 59, said support body of said model comprising at least one story of skeletal elements.

72. The method of claim 59, said model further comprising an outer shell that substantially surrounds said support body.

73. A mold comprising:
   a. a thin inner shell that defines a three dimensional cavity; and
   b. a three-dimensional foraminous support body that is contiguous with and substantially surrounds said inner shell, said support body comprising skeletal elements with voids therebetween, the voids comprising a network having an open pathway from each void to outside said support body, the skeletal elements and voids arranged to provide a predetermined pattern of heat transfer from any casting material as it cools to form a part to be made with said mold, which heat transfer varies at different locations in said pattern.

74. The mold of claim 73, said skeletal elements comprising sheets.

75. The mold of claim 74, said sheets arranged to impede the transfer of heat from said casting material.

76. The mold of claim 75, said sheets arranged as radiation shields.

77. the mold of claim 75, said sheets arranged as convection shields.

78. The mold of claim 74, said sheets arranged to direct the transfer of heat from said casting material along a predetermined path.

79. The mold of claim 73, said skeletal elements comprising struts.

80. A method of making a mold, said method using a solid free form layered fabrication technique, comprising the steps of:
   a. providing a machine readable model of a mold geometry comprising:
      i. a thin inner shell that defines a three dimensional cavity; and
      ii. a three-dimensional support body that is contiguous with and substantially surrounds said inner shell, said support body being constructed of skeletal elements with voids therebetween, the voids comprising a network having an open pathway from each void to outside said support body, the skeletal elements and voids arranged to provide a predetermined pattern of heat transfer from any casting material as it cools to form a part to be made with said mold, which heat transfer varies at different locations in said pattern; and b. using said model to drive a solid free form layered fabrication machine, building up, by layers of material, a mold that is defined by said geometry.

81. The method of claim 80, said skeletal elements comprising sheets.

82. The method of claim 81, said sheets arranged to impede the transfer of heat from said casting material.

83. The method of claim 81, said sheets arranged to direct the transfer of heat from said casting material along a predetermined path.

84. The method of claim 80, said skeletal elements comprising struts.

* * * * *